US007925694B2

(12) United States Patent
Harris

(10) Patent No.: US 7,925,694 B2
(45) Date of Patent: Apr. 12, 2011

(54) SYSTEMS AND METHODS FOR MANAGING COOKIES VIA HTTP CONTENT LAYER

(75) Inventor: James Harris, San Jose, CA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 640 days.

(21) Appl. No.: 11/875,671

(22) Filed: Oct. 19, 2007

(65) Prior Publication Data
US 2009/0106349 A1  Apr. 23, 2009

(51) Int. Cl.
G06F 15/16 (2006.01)
(52) U.S. Cl. .................... 709/203; 709/227; 709/228
(58) Field of Classification Search .............. 709/203
See application file for complete search history.

(56) References Cited

U.S. PATENT DOCUMENTS

| | | | |
|---|---|---|---|
| 5,774,670 A | 6/1998 | Montulli | |
| 5,848,396 A | 12/1998 | Gerace | |
| 5,862,325 A | 1/1999 | Reed et al. | |
| 5,867,494 A | 2/1999 | Krishnaswamy et al. | |
| 5,909,559 A | 6/1999 | So | |
| 5,931,917 A | 8/1999 | Nguyen et al. | |
| 5,973,696 A | 10/1999 | Agranat et al. | |
| 5,978,840 A | 11/1999 | Nguyen et al. | |
| 5,983,208 A | 11/1999 | Haller et al. | |
| 5,983,227 A | 11/1999 | Nazem et al. | |
| 5,991,735 A | 11/1999 | Gerace | |
| 5,999,525 A | 12/1999 | Krishnaswamy et al. | |
| 6,006,260 A | 12/1999 | Barrick, Jr. et al. | |
| 6,009,410 A | 12/1999 | LeMole et al. | |
| 6,011,537 A | 1/2000 | Slotznick | |
| 6,026,379 A | 2/2000 | Haller et al. | |

(Continued)

FOREIGN PATENT DOCUMENTS
AU    7865401 A    1/2002
(Continued)

OTHER PUBLICATIONS

International Search Report, PCT/US08/074400, mailed Jan. 20, 2009, 4 pages.

(Continued)

*Primary Examiner* — Aaron Strange
*Assistant Examiner* — Jonathan Bui
(74) *Attorney, Agent, or Firm* — Christopher McKenna

(57) ABSTRACT

The cookie management system and methods of the present solution address issues with rewriting cookie headers by handling cookies in the content layer of HTTP instead of the HTTP transaction layer. The present solution maintains cookie information for a browser via an intermediary and installs the correct cookie parameters in the browser via the HTTP content layer. Instead of using the headers of the HTTP transaction layer which may cause issues due to rewriting, the present solution manages the cookies outside of this layer. This avoids the browser managing the cookies incorrectly. Set cookies headers served from a server in response to client HTTP requests are removed by the intermediary. Cookie information from the headers are stored in a cookie jar on the intermediary. The intermediary delivers instructions and scripts via the content layer of the HTTP response to set the cookie in the browser. The scripts detect browser changes to the cookie and communicates the changes to the intermediary to update the cookie jar. With the present solution, the domain and path names of a cookie are set correctly on the browser when delivering content via a reverse proxy.

36 Claims, 13 Drawing Sheets

U.S. PATENT DOCUMENTS

| | | | |
|---|---|---|---|
| 6,055,564 A | 4/2000 | Phaal | |
| 6,078,956 A | 6/2000 | Bryant et al. | |
| 6,085,224 A | 7/2000 | Wagner | |
| 6,088,717 A | 7/2000 | Reed et al. | |
| 6,108,662 A | 8/2000 | Hoskins et al. | |
| 6,141,699 A | 10/2000 | Luzzi et al. | |
| 6,157,864 A | 12/2000 | Schwenke et al. | |
| 6,161,051 A | 12/2000 | Hafemann et al. | |
| 6,161,139 A | 12/2000 | Win et al. | |
| 6,163,772 A | 12/2000 | Kramer et al. | |
| 6,167,406 A | 12/2000 | Hoskins et al. | |
| 6,170,017 B1 | 1/2001 | Dias et al. | |
| 6,178,409 B1 | 1/2001 | Weber et al. | |
| 6,182,142 B1 | 1/2001 | Win et al. | |
| 6,185,625 B1 | 2/2001 | Tso et al. | |
| 6,208,991 B1 | 3/2001 | French et al. | |
| 6,253,027 B1 | 6/2001 | Weber et al. | |
| 6,256,739 B1 | 7/2001 | Skopp et al. | |
| 6,263,365 B1 | 7/2001 | Scherpbier | |
| 6,268,853 B1 | 7/2001 | Hoskins et al. | |
| 6,300,947 B1 | 10/2001 | Kanevsky | |
| 6,304,915 B1 | 10/2001 | Nguyen et al. | |
| 6,314,406 B1 | 11/2001 | O'Hagan et al. | |
| 6,317,777 B1 | 11/2001 | Skarbo et al. | |
| 6,321,235 B1 | 11/2001 | Bird et al. | |
| 6,324,525 B1 | 11/2001 | Kramer et al. | |
| 6,334,111 B1 | 12/2001 | Carrott | |
| 6,335,927 B1 | 1/2002 | Elliott et al. | |
| 6,345,288 B1 | 2/2002 | Reed et al. | |
| 6,360,270 B1 | 3/2002 | Cherkasova et al. | |
| 6,363,363 B1 | 3/2002 | Haller et al. | |
| 6,373,950 B1 | 4/2002 | Rowney | |
| 6,374,300 B2 | 4/2002 | Masters | |
| 6,383,478 B1 | 5/2002 | Prokop et al. | |
| 6,393,467 B1 | 5/2002 | Potvin et al. | |
| 6,397,253 B1 | 5/2002 | Quinlan et al. | |
| 6,400,996 B1 | 6/2002 | Hoffberg et al. | |
| 6,421,768 B1 | 7/2002 | Purpura | |
| 6,430,567 B2 | 8/2002 | Burridge | |
| 6,438,597 B1 | 8/2002 | Mosberger et al. | |
| 6,446,109 B2 | 9/2002 | Gupta | |
| 6,449,627 B1 | 9/2002 | Baer et al. | |
| 6,466,940 B1 | 10/2002 | Mills et al. | |
| 6,473,802 B2 | 10/2002 | Masters | |
| 6,502,102 B1 | 12/2002 | Haswell et al. | |
| 6,505,230 B1 | 1/2003 | Mohan et al. | |
| 6,510,466 B1 | 1/2003 | Cox et al. | |
| 6,515,968 B1 | 2/2003 | Combar et al. | |
| 6,523,027 B1 | 2/2003 | Underwood | |
| 6,549,612 B2 | 4/2003 | Gifford et al. | |
| 6,553,377 B1 | 4/2003 | Eschelbeck et al. | |
| 6,556,950 B1 | 4/2003 | Schwenke et al. | |
| 6,560,639 B1 | 5/2003 | Dan et al. | |
| 6,567,852 B2 | 5/2003 | Besaw et al. | |
| 6,591,266 B1 | 7/2003 | Li et al. | |
| 6,595,417 B2 | 7/2003 | O'Hagan et al. | |
| 6,601,057 B1 | 7/2003 | Underwood et al. | |
| 6,601,233 B1 | 7/2003 | Underwood | |
| 6,606,744 B1 | 8/2003 | Mikurak | |
| 6,609,128 B1 | 8/2003 | Underwood | |
| 6,609,198 B1 | 8/2003 | Wood et al. | |
| 6,611,840 B1 | 8/2003 | Baer et al. | |
| 6,625,643 B1 | 9/2003 | Colby et al. | |
| 6,629,081 B1 | 9/2003 | Cornelius et al. | |
| 6,631,416 B2 | 10/2003 | Bendinelli et al. | |
| 6,633,878 B1 | 10/2003 | Underwood | |
| 6,640,145 B2 | 10/2003 | Hoffberg et al. | |
| 6,640,240 B1 | 10/2003 | Hoffman et al. | |
| 6,643,696 B2 | 11/2003 | Davis et al. | |
| 6,671,818 B1 | 12/2003 | Mikurak | |
| 6,687,745 B1 | 2/2004 | Franco et al. | |
| 6,691,232 B1 | 2/2004 | Wood et al. | |
| 6,697,824 B1 | 2/2004 | Bowman-Amuah | |
| 6,701,514 B1 | 3/2004 | Haswell et al. | |
| 6,704,873 B1 | 3/2004 | Underwood | |
| 6,714,219 B2 | 3/2004 | Lindhorst et al. | |
| 6,714,979 B1 | 3/2004 | Brandt et al. | |
| 6,718,328 B1 | 4/2004 | Norris | |
| 6,718,535 B1 | 4/2004 | Underwood | |
| 6,731,625 B1 | 5/2004 | Eastep et al. | |
| 6,732,331 B1 | 5/2004 | Alexander | |
| 6,735,497 B2 | 5/2004 | Wallace et al. | |
| 6,754,181 B1 | 6/2004 | Elliott et al. | |
| 6,754,699 B2 | 6/2004 | Swildens et al. | |
| 6,754,706 B1 | 6/2004 | Swildens et al. | |
| 6,757,365 B1 | 6/2004 | Bogard | |
| 6,757,710 B2 | 6/2004 | Reed | |
| 6,771,290 B1 | 8/2004 | Hoyle | |
| 6,772,139 B1 | 8/2004 | Smith, III | |
| 6,785,653 B1 | 8/2004 | White et al. | |
| 6,789,170 B1 | 9/2004 | Jacobs et al. | |
| RE38,609 E | 10/2004 | Chen et al. | |
| 6,820,125 B1 | 11/2004 | Dias et al. | |
| 6,823,374 B2 | 11/2004 | Kausik et al. | |
| 6,826,594 B1 | 11/2004 | Pettersen | |
| 6,826,696 B1 | 11/2004 | Chawla et al. | |
| 6,839,701 B1 | 1/2005 | Baer et al. | |
| 6,850,252 B1 | 2/2005 | Hoffberg | |
| 6,862,553 B2 | 3/2005 | Schwenke et al. | |
| 6,879,965 B2 | 4/2005 | Fung et al. | |
| 6,889,379 B1 | 5/2005 | Lindhorst et al. | |
| 6,904,449 B1 | 6/2005 | Quinones | |
| 6,907,546 B1 | 6/2005 | Haswell et al. | |
| 6,909,708 B1 | 6/2005 | Krishnaswamy et al. | |
| 6,917,972 B1 | 7/2005 | Basko et al. | |
| 6,928,469 B1 | 8/2005 | Duursma et al. | |
| 6,952,425 B1 | 10/2005 | Nelson | |
| 6,952,714 B2 | 10/2005 | Peart | |
| 6,968,364 B1 | 11/2005 | Wong et al. | |
| 6,976,090 B2 | 12/2005 | Ben-Shaul et al. | |
| 6,980,962 B1 | 12/2005 | Arganbright et al. | |
| 6,981,143 B2 | 12/2005 | Mullen et al. | |
| 6,981,215 B1 | 12/2005 | Lindhorst et al. | |
| 6,986,102 B1 | 1/2006 | Baer et al. | |
| 6,988,126 B2 | 1/2006 | Wilcock et al. | |
| 6,993,456 B2 | 1/2006 | Brooks et al. | |
| 6,996,605 B2 | 2/2006 | Low et al. | |
| 6,996,616 B1 | 2/2006 | Leighton et al. | |
| 6,996,628 B2 | 2/2006 | Keane et al. | |
| 7,000,019 B2 | 2/2006 | Low et al. | |
| 7,006,881 B1 | 2/2006 | Hoffberg et al. | |
| 7,006,893 B2 | 2/2006 | Hart et al. | |
| 7,006,993 B1 | 2/2006 | Cheong et al. | |
| 7,007,034 B1 | 2/2006 | Hartman, Jr. et al. | |
| 7,013,290 B2 | 3/2006 | Ananian et al. | |
| 7,024,477 B2 | 4/2006 | Allan | |
| 7,028,333 B2 | 4/2006 | Tuomenoksa et al. | |
| 7,028,334 B2 | 4/2006 | Tuomenoksa | |
| 7,032,010 B1 | 4/2006 | Swildens et al. | |
| 7,032,030 B1 | 4/2006 | Codignotto | |
| 7,034,691 B1 | 4/2006 | Rapaport et al. | |
| 7,035,907 B1 | 4/2006 | Decasper et al. | |
| 7,042,879 B2 | 5/2006 | Eschbach et al. | |
| 7,043,488 B1 | 5/2006 | Baer et al. | |
| 7,047,315 B1 | 5/2006 | Srivastava | |
| 7,047,424 B2 | 5/2006 | Bendinelli et al. | |
| 7,051,036 B2 | 5/2006 | Rosnow et al. | |
| 7,051,080 B1 | 5/2006 | Paul et al. | |
| 7,055,169 B2 | 5/2006 | Delpuch et al. | |
| 7,069,234 B1 | 6/2006 | Cornelius et al. | |
| 7,072,807 B2 | 7/2006 | Brown et al. | |
| 7,076,494 B1 | 7/2006 | Baer et al. | |
| 7,085,834 B2 | 8/2006 | Delany et al. | |
| 7,085,854 B2 | 8/2006 | Keane et al. | |
| 7,089,239 B1 | 8/2006 | Baer et al. | |
| 7,092,370 B2 | 8/2006 | Jiang et al. | |
| 7,093,020 B1 | 8/2006 | McCarty et al. | |
| 7,096,418 B1 | 8/2006 | Singhal et al. | |
| 7,100,054 B2 | 8/2006 | Wenisch et al. | |
| 7,100,195 B1 | 8/2006 | Underwood | |
| 7,102,996 B1 | 9/2006 | Amdahl et al. | |
| 7,107,338 B1 | 9/2006 | Nareddy et al. | |
| 7,117,243 B2 | 10/2006 | Peart | |
| 7,117,359 B2 | 10/2006 | Wood et al. | |
| 7,117,504 B2 | 10/2006 | Smith et al. | |
| 7,124,101 B1 | 10/2006 | Mikurak | |
| 7,124,175 B1 | 10/2006 | Wolfe et al. | |

| | | | | | | |
|---|---|---|---|---|---|---|
| 7,127,713 B2 | 10/2006 | Davis et al. | | 2003/0131045 A1* | 7/2003 | McGee et al. ............... 709/201 |
| 7,130,792 B2 | 10/2006 | Tokieda et al. | | 2003/0131081 A1 | 7/2003 | Nareddy et al. |
| 7,130,807 B1 | 10/2006 | Mikurak | | 2003/0131100 A1 | 7/2003 | Godon et al. |
| 7,133,837 B1 | 11/2006 | Barnes, Jr. | | 2003/0140312 A1 | 7/2003 | Mohan et al. |
| 7,134,131 B1 | 11/2006 | Hendricks et al. | | 2003/0144988 A1 | 7/2003 | Nareddy et al. |
| 7,145,898 B1 | 12/2006 | Elliott | | 2003/0154239 A1 | 8/2003 | Davis et al. |
| 7,146,384 B2 | 12/2006 | Sawafta | | 2003/0182357 A1* | 9/2003 | Chess et al. ................. 709/203 |
| 7,152,207 B1 | 12/2006 | Underwood et al. | | 2003/0191812 A1 | 10/2003 | Agarwalla et al. |
| 7,162,509 B2 | 1/2007 | Brown et al. | | 2003/0206554 A1 | 11/2003 | Dillon |
| 7,167,844 B1 | 1/2007 | Leong et al. | | 2003/0233541 A1 | 12/2003 | Fowler et al. |
| 7,171,478 B2 | 1/2007 | Lueckhoff et al. | | 2003/0233581 A1 | 12/2003 | Reshef et al. |
| 7,178,106 B2 | 2/2007 | Lamkin et al. | | 2004/0031058 A1 | 2/2004 | Reisman |
| 7,181,766 B2 | 2/2007 | Bendinelli et al. | | 2004/0039827 A1 | 2/2004 | Thomas et al. |
| 7,188,183 B1 | 3/2007 | Paul et al. | | 2004/0044731 A1 | 3/2004 | Chen et al. |
| 7,188,216 B1 | 3/2007 | Rajkumar et al. | | 2004/0049673 A1 | 3/2004 | Song et al. |
| 7,197,502 B2 | 3/2007 | Feinsmith | | 2004/0073512 A1 | 4/2004 | Maung |
| 7,200,530 B2 | 4/2007 | Brown et al. | | 2004/0073629 A1* | 4/2004 | Bazot et al. .................. 709/217 |
| 7,206,805 B1 | 4/2007 | McLaughlin, Jr. | | 2004/0073630 A1 | 4/2004 | Copeland et al. |
| 7,210,100 B2 | 4/2007 | Berger et al. | | 2004/0122951 A1 | 6/2004 | Beck et al. |
| 7,216,149 B1 | 5/2007 | Briscoe et al. | | 2004/0128346 A1 | 7/2004 | Melamed et al. |
| 7,225,244 B2 | 5/2007 | Reynolds et al. | | 2004/0158429 A1 | 8/2004 | Bary et al. |
| 7,231,357 B1 | 6/2007 | Shanman et al. | | 2004/0162876 A1 | 8/2004 | Kohavi |
| 7,231,405 B2 | 6/2007 | Xia | | 2004/0177247 A1 | 9/2004 | Peles |
| 7,246,230 B2 | 7/2007 | Stanko | | 2004/0181750 A1 | 9/2004 | Lection et al. |
| 7,313,613 B1 | 12/2007 | Brooking et al. | | 2004/0210771 A1 | 10/2004 | Wood et al. |
| 7,313,822 B2 | 12/2007 | Ben-Itzhak et al. | | 2004/0267820 A1 | 12/2004 | Boss et al. |
| 7,330,872 B2 | 2/2008 | Peart et al. | | 2004/0268357 A1 | 12/2004 | Joy et al. |
| 7,343,486 B1 | 3/2008 | McCarty et al. | | 2004/0268358 A1 | 12/2004 | Darling et al. |
| 7,350,194 B1 | 3/2008 | Alpern | | 2005/0015429 A1* | 1/2005 | Ashley et al. ................. 709/200 |
| 7,360,025 B1 | 4/2008 | O'Connell et al. | | 2005/0015601 A1 | 1/2005 | Tabi |
| 7,464,332 B2 | 12/2008 | Carter, II | | 2005/0027799 A1 | 2/2005 | Tsutsui et al. |
| 7,506,359 B1 | 3/2009 | Ling | | 2005/0033858 A1 | 2/2005 | Swildens et al. |
| 7,512,702 B1 | 3/2009 | Srivastava et al. | | 2005/0039190 A1 | 2/2005 | Rees et al. |
| 7,584,500 B2 | 9/2009 | Dillon et al. | | 2005/0074126 A1 | 4/2005 | Stanko |
| 2001/0037387 A1 | 11/2001 | Gilde et al. | | 2005/0108517 A1 | 5/2005 | Dillon et al. |
| 2001/0037400 A1 | 11/2001 | Raz et al. | | 2005/0120054 A1 | 6/2005 | Shulman et al. |
| 2002/0007404 A1 | 1/2002 | Vange et al. | | 2005/0144481 A1 | 6/2005 | Hopen et al. |
| 2002/0010855 A1 | 1/2002 | Reshef et al. | | 2005/0183140 A1 | 8/2005 | Goddard |
| 2002/0023210 A1 | 2/2002 | Tuomenoksa et al. | | 2005/0198335 A1 | 9/2005 | Brown et al. |
| 2002/0026531 A1 | 2/2002 | Keane et al. | | 2005/0251856 A1 | 11/2005 | Araujo et al. |
| 2002/0033844 A1 | 3/2002 | Levy et al. | | 2005/0256923 A1 | 11/2005 | Adachi |
| 2002/0049900 A1 | 4/2002 | Patrick | | 2005/0262063 A1 | 11/2005 | Conboy et al. |
| 2002/0055966 A1 | 5/2002 | Border et al. | | 2005/0262357 A1 | 11/2005 | Araujo et al. |
| 2002/0059327 A1 | 5/2002 | Starkey | | 2005/0273849 A1 | 12/2005 | Araujo et al. |
| 2002/0059425 A1 | 5/2002 | Belfiore et al. | | 2006/0041635 A1 | 2/2006 | Alexander et al. |
| 2002/0065911 A1 | 5/2002 | von Klopp et al. | | 2006/0047974 A1 | 3/2006 | Alpern et al. |
| 2002/0065919 A1 | 5/2002 | Taylor et al. | | 2006/0068755 A1 | 3/2006 | Shraim et al. |
| 2002/0078147 A1* | 6/2002 | Bouthors et al. ............... 709/203 | | 2006/0075464 A1 | 4/2006 | Golan et al. |
| 2002/0083175 A1 | 6/2002 | Afek et al. | | 2006/0112174 A1 | 5/2006 | L'Heureux et al. |
| 2002/0083178 A1 | 6/2002 | Brothers | | 2006/0161970 A1 | 7/2006 | Hopen et al. |
| 2002/0091859 A1 | 7/2002 | Tuomenoksa et al. | | 2007/0011340 A1 | 1/2007 | Seidl et al. |
| 2002/0116582 A1 | 8/2002 | Copeland et al. | | 2007/0067046 A1 | 3/2007 | Berg |
| 2002/0116642 A1 | 8/2002 | Joshi et al. | | 2007/0101418 A1 | 5/2007 | Wood et al. |
| 2002/0120743 A1 | 8/2002 | Shabtay et al. | | 2007/0136477 A1 | 6/2007 | Bryce et al. |
| 2002/0133723 A1 | 9/2002 | Tait | | 2007/0156852 A1 | 7/2007 | Sundarrajan et al. |
| 2002/0138511 A1 | 9/2002 | Psounis et al. | | 2007/0169179 A1 | 7/2007 | Narad |
| 2002/0138572 A1 | 9/2002 | Delany et al. | | 2007/0179955 A1 | 8/2007 | Croft et al. |
| 2002/0138618 A1 | 9/2002 | Szabo | | 2007/0192444 A1 | 8/2007 | Ackaouy et al. |
| 2002/0143798 A1 | 10/2002 | Lisiecki et al. | | 2007/0192853 A1 | 8/2007 | Shraim et al. |
| 2002/0143888 A1 | 10/2002 | Lisiecki et al. | | 2007/0245409 A1 | 10/2007 | Harris et al. |
| 2002/0147774 A1 | 10/2002 | Lisiecki et al. | | 2007/0294762 A1 | 12/2007 | Shraim et al. |
| 2002/0147927 A1 | 10/2002 | Tait | | 2007/0299915 A1 | 12/2007 | Shraim et al. |
| 2002/0156831 A1 | 10/2002 | Suorsa et al. | | 2007/0300185 A1 | 12/2007 | Macbeth et al. |
| 2002/0161801 A1 | 10/2002 | Hind et al. | | 2008/0016233 A1 | 1/2008 | Schneider |
| 2002/0161904 A1 | 10/2002 | Tredoux et al. | | 2008/0034416 A1 | 2/2008 | Kumar et al. |
| 2002/0165971 A1 | 11/2002 | Baron | | 2008/0034425 A1 | 2/2008 | Overcash et al. |
| 2002/0178211 A1 | 11/2002 | Singhal et al. | | 2008/0046616 A1 | 2/2008 | Verzunov et al. |
| 2003/0014368 A1 | 1/2003 | Leurig et al. | | 2008/0049786 A1 | 2/2008 | Ram et al. |
| 2003/0023873 A1 | 1/2003 | Ben-Itzhak | | 2008/0225720 A1 | 9/2008 | Khemani et al. |
| 2003/0037108 A1 | 2/2003 | Peiffer et al. | | 2008/0225748 A1 | 9/2008 | Khemani et al. |
| 2003/0051142 A1 | 3/2003 | Hidalgo et al. | | 2008/0225753 A1 | 9/2008 | Khemani et al. |
| 2003/0065763 A1 | 4/2003 | Swildens et al. | | 2008/0229381 A1 | 9/2008 | Sikka et al. |
| 2003/0069803 A1 | 4/2003 | Pollitt | | 2010/0071052 A1* | 3/2010 | Mao et al. ....................... 726/12 |
| 2003/0069923 A1 | 4/2003 | Peart | | | | |
| 2003/0069924 A1 | 4/2003 | Peart et al. | | FOREIGN PATENT DOCUMENTS | | |
| 2003/0074580 A1 | 4/2003 | Knouse et al. | | EP 0863453 A1 | | 9/1998 |
| 2003/0110192 A1 | 6/2003 | Valente et al. | | EP 1311957 A2 | | 5/2003 |
| 2003/0110266 A1 | 6/2003 | Rollins et al. | | EP 1 345 378 A2 | | 9/2003 |
| 2003/0126266 A1 | 7/2003 | Peles | | EP 1 376 410 A1 | | 1/2004 |

| | | |
|---|---|---|
| EP | 1398715 A2 | 3/2004 |
| EP | 2015236 A1 | 1/2009 |
| GB | 2300551 | 11/1996 |
| JP | 2004504681 T | 2/2004 |
| WO | WO-99/64967 A1 | 12/1999 |
| WO | WO-0051031 | 8/2000 |
| WO | WO 0068823 A2 * | 11/2000 |
| WO | WO-0154375 A2 | 7/2001 |
| WO | WO 0213026 A1 * | 2/2002 |
| WO | WO-02/27552 A2 | 4/2002 |
| WO | WO-0245370 A2 | 6/2002 |
| WO | WO-03029977 A2 | 4/2003 |
| WO | WO-2004072804 | 8/2004 |
| WO | WO-2004114529 A2 | 12/2004 |
| WO | WO-2007024647 A2 | 3/2007 |
| WO | WO-2007/065146 A2 | 6/2007 |
| WO | WO-2008/112691 A2 | 9/2008 |
| WO | WO-2008/112698 A2 | 9/2008 |

OTHER PUBLICATIONS

Tichenor, Charles B., "JavaScript Cookies," Dr. Dobb's Journal, May 1, 1997, pp. 1-7.

Written Opinion of the International Searching Authority, PCT/US08/074400, mailed Jan. 20, 2009, 7 pages.

* cited by examiner

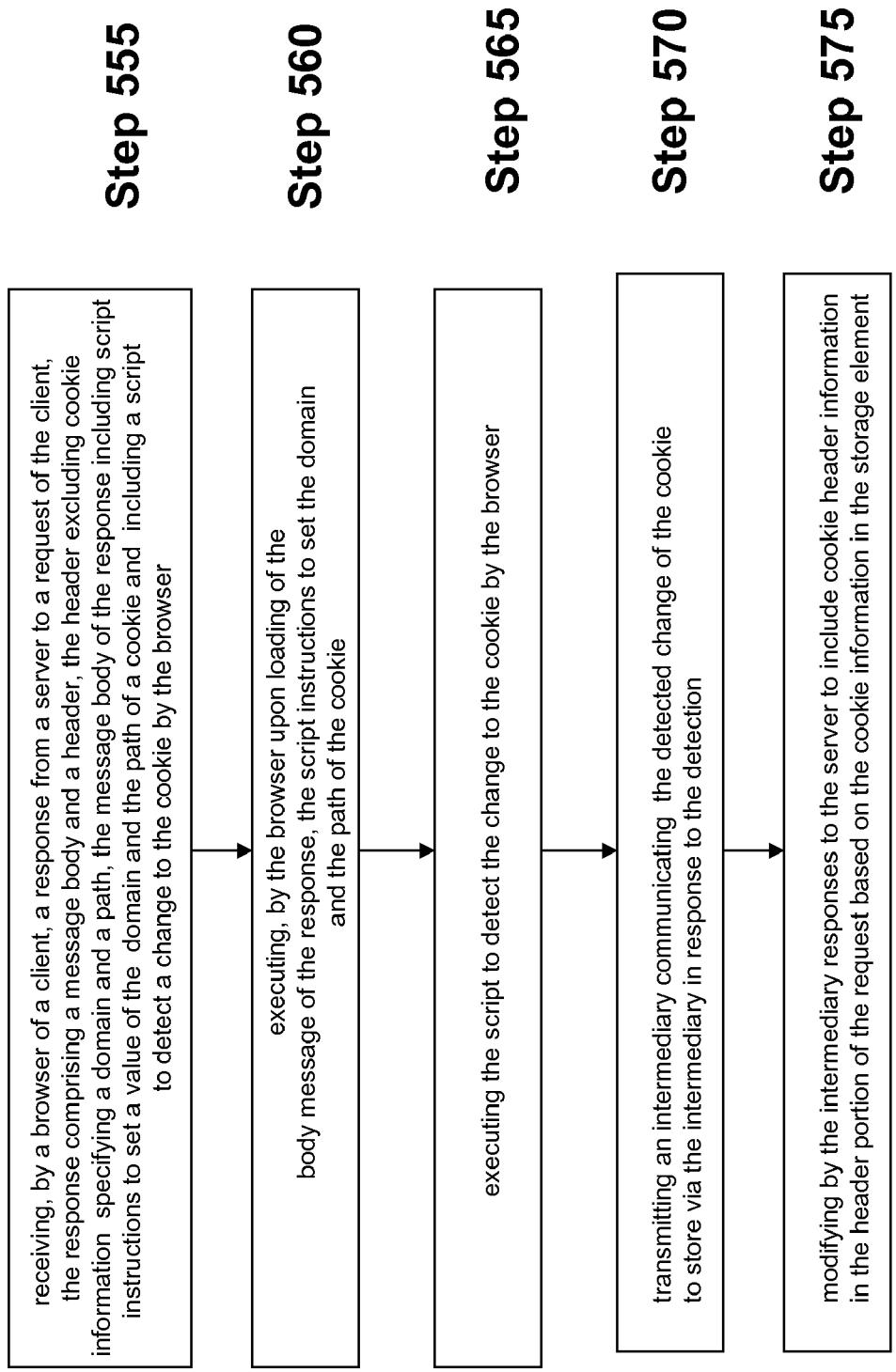

SYSTEMS AND METHODS FOR MANAGING COOKIES VIA HTTP CONTENT LAYER

FIELD OF THE INVENTION

The present application generally relates to data communication networks. In particular, the present invention relates to systems and methods for managing cookies via an intermediary for a browser outside of the HTTP transaction layer.

BACKGROUND OF THE INVENTION

A reverse proxy is a forwarding topology where the proxy is on behalf of a back-end HTTP server. A reverse proxy is installed within the neighborhood of one or more servers. Typically, reverse proxies are utilized in front of web servers and operate as an application proxy for servers using HTTP. In some cases, a reverse proxy may rewrite content delivered from the web server to the client. For example, a reverse proxy may rewrite a URL of a web page served to a client. Some of the pages served by an HTTP server may include a set-cookie header in the HTTP transaction to set a cookie for the client. In rewriting content, the reverse proxy may rewrite the set-cookie header to have a browser accept and manage the cookie. A reverse proxy may disregard the path and domain values of the set-cookie header in rewriting the cookie. In another case, the reverse proxy may re-write the cookies to encode the path and domain values into an element of the set-cookie header. These re-written set-cookie headers may lead to security leaks and data corruption.

BRIEF SUMMARY OF THE INVENTION

The cookie management systems and methods of the present solution address issues with rewriting cookie headers by handling cookies in the content layer of HTTP instead of the HTTP transaction layer. The present solution maintains cookie information for a browser via an intermediary and installs the correct cookie parameters in the browser via the HTTP content layer. Instead of using the headers of the HTTP transaction layer which may cause issues due to rewriting, the present solution manages the cookies outside of this layer. This avoids the browser managing the cookies incorrectly. Set-cookie headers served from a server in response to client HTTP requests are removed by the intermediary. Cookie information from the headers may be stored in a cookie jar on the intermediary. This cookie jar may include configured cookie information. The intermediary delivers instructions and scripts via the content layer of the HTTP response to set the cookie in the browser based on the cookie information stored in the cookie jar. The script detects browser changes to the cookie and communicates the changes to the intermediary to update the cookie jar. With the present solution, the domain and path names of a cookie are set correctly on the browser when delivering content via a reverse proxy.

In some embodiments, the intermediary may consume many or most of the set-cookie headers or cookies served from the server. The intermediary may use configuration information to determine which cookies should or should not be present or made available to the client and the type and content of the cookie to be set on the client, if any. Based on the configuration and functionality of the intermediary, the present solution may use the content layer of an HTTP request/response to establish and maintain the cookies on the client. Furthermore, the intermediary may install scripts via the content layer to detect client-side cookie activity, such as establishing and changing of cookies by any client-side element. In addition to supporting the configuration of the intermediary, the present solution maintains cookies for these client-side elements that may be using cookies for communications or for storing or transmitting state to a server.

In one aspect, the present invention is related to a method for managing browser cookies by an intermediary between a client and server via content of a Hypertext Transfer Protocol (HTTP) message. The method includes receiving by an intermediary a response of the server to a request of the client. The response may include a header and a message body. The header may include cookie information specifying a domain and a path attribute values of a cookie. The method also includes removing the cookie information from the header of the response and storing the cookie information in a storage element. The method further includes modifying, by the intermediary, the message body of the response to include script instructions for execution by a browser of the client to set a value of the domain and the path of the cookie based on the cookie information stored in the storage element and to include a script for execution by the browser to detect a change to the cookie by the browser. The intermediary forwards the modified response to the client.

In some embodiments, the method includes modifying, by the intermediary, the message body to identify a Uniform Resource Locator of the script that detects the change to the cookie. The Uniform Resource Locator may identify a location in storage of the intermediary. In another embodiment, the method includes inserting, by the intermediary, in the message body of the response instructions of the script to detect the change to the cookie. The intermediary may receive a message to update cookie information in the intermediary based on the script detecting the change to the cookie. In some embodiments of the method, the intermediary modifies the message body of the response to include one or more scripts to detect an event of the browser to add, delete or modify the cookie. The intermediary may modify the message body of the response to include one or more scripts to remove the cookie upon detection of an unload event of the browser.

In response to the message, the intermediary may make the change to the cookie information stored in the storage element. In another embodiment, the method includes the step of receiving, by the intermediary, a request from the browser including a second cookie having encoded values representing changes to the cookie, and in response to receiving the second cookie, updating the cookie information in the storage element based on the second cookie. In some embodiments, the intermediary provides a virtual private network connection between the client and the server and rewrites a Uniform Resource Locator in the modified response to translate the Uniform Resource Locator between a first network of the client and a second network of the server. The intermediary may rewrite the domain and the path of the cookie information in the modified response to translate between the first network of the client and the second network of the server. In another embodiment, the intermediary receives from the browser a second request, modifies the header of the request to include cookie information stored in the storage element, and forwards the modified request to the server.

In another aspect, the present invention is related to a method for managing cookies by a script for a browser via content of an Hypertext Transfer Protocol (HTTP) message. The method includes a step of receiving, by a browser of a client, a response from a server to a request of the client. The response includes a message body and a header. The header may exclude cookie information specifying a domain and a path. The message body of the response may include script instructions to set a value of the domain and the path of a cookie. The message body may also include a script to detect a change to the cookie by the browser. Upon loading of the body message of the response, the browser may execute the script instructions to set the domain and the path of the cookie. The browser may also execute the script to detect the change to the cookie by the browser. The script may set one or more values of a second cookie to encode the change to the cookie. The browser may transmit the second cookie to the intermediary. In response to the detection, the script may transmit to an intermediary a message communicating the detected change of the cookie to store via the intermediary.

In some embodiments, the script manages the cookie in the context of the browser transparently to the browser. The script may establish or manage the cookie external to a transaction layer or a header layer of HTTP. In one embodiment, the browser receives the response from the server via the intermediary. The intermediary may remove cookie information from the header, and modify the message body of the response to include the script instructions and the script.

In one embodiment, the script executes in response to a browser event. The script may detect an add, delete or modification to the cookie. The script may remove the cookie from the browser in response to an unload event. The browser may obtain via the script instructions a copy of the script from the intermediary.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIG. 5B is a flow diagram depicting another embodiment of steps of a method for managing browser cookies in conjunction with FIG. 5A.

Figure 1A:
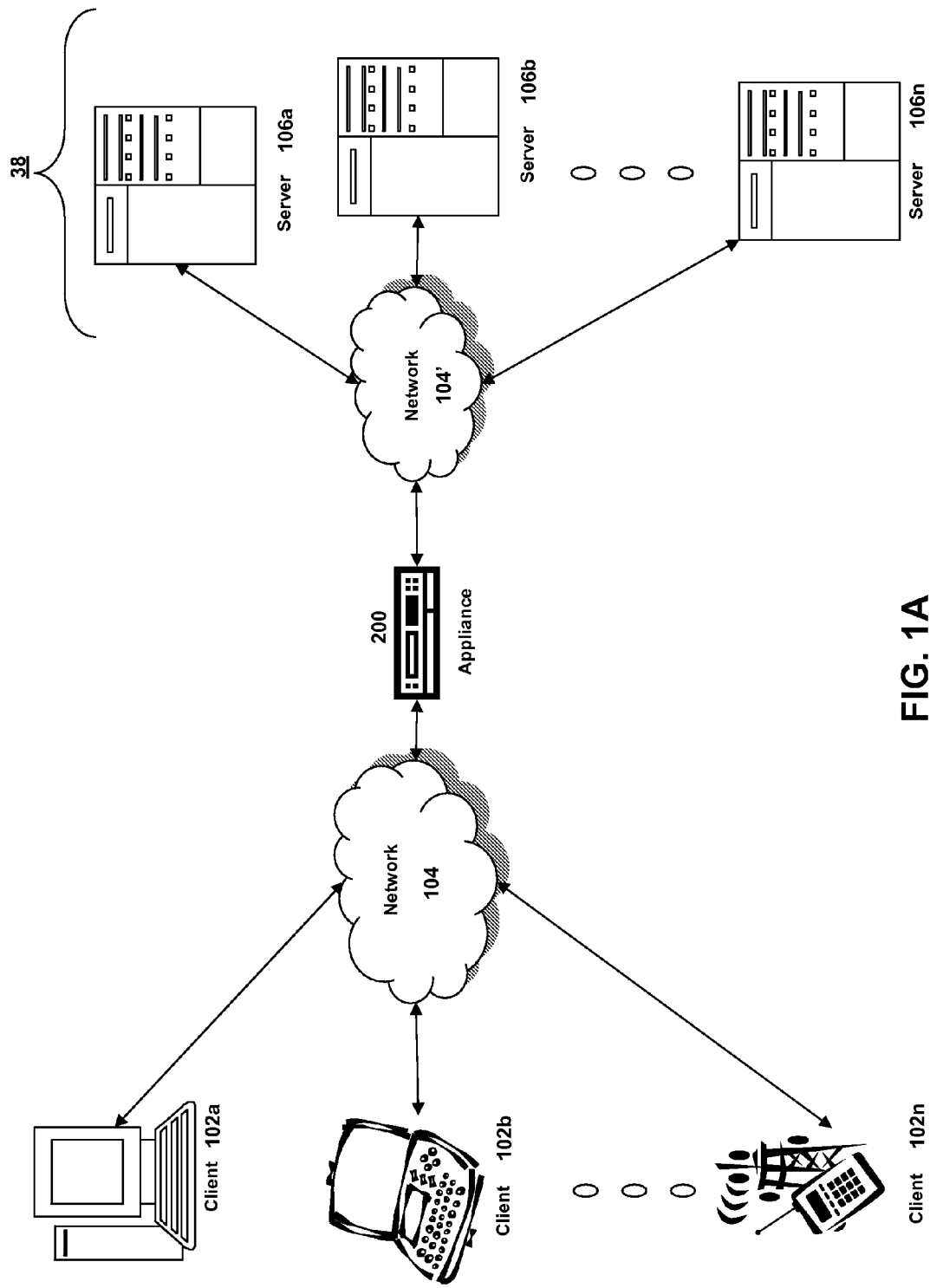
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments of the present invention below, the following descriptions of the sections of the specification and their respective contents may be helpful:

Section A describes a network environment and computing environment useful for practicing an embodiment of the present invention;

Section B describes embodiments of a system and appliance architecture for accelerating delivery of a computing environment to a remote user;

Section C describes embodiments of a client agent for accelerating communications between a client and a server; and Section D describes embodiments of systems and methods for managing cookies by an intermediary and client-side scripts via a content layer of HTTP transactions.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the servers 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 may be heterogeneous. One or more of the servers 106 can operate according to one type of operating system platform (e.g., WINDOWS NT, manufactured by Microsoft Corp. of Redmond, Wash.), while one or more of the other servers 106 can operate according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
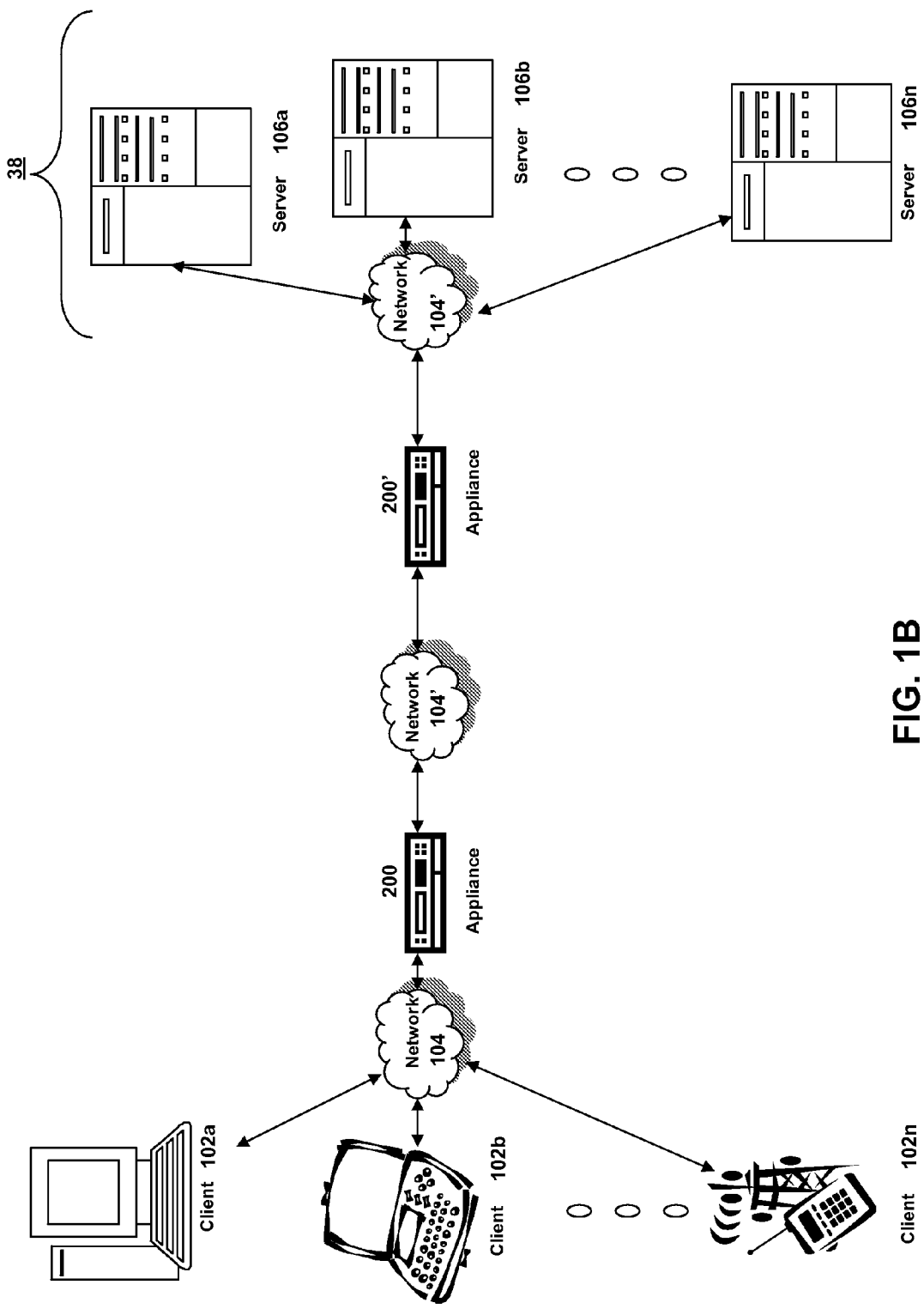
FIG. 1B is a block diagram of an embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example, a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office. In some embodiments, the first appliance 200 and second appliance 200' work in cooperation or in conjunction with each other to accelerate network traffic or the delivery of application and data between a client and a server.

Figure 1C:
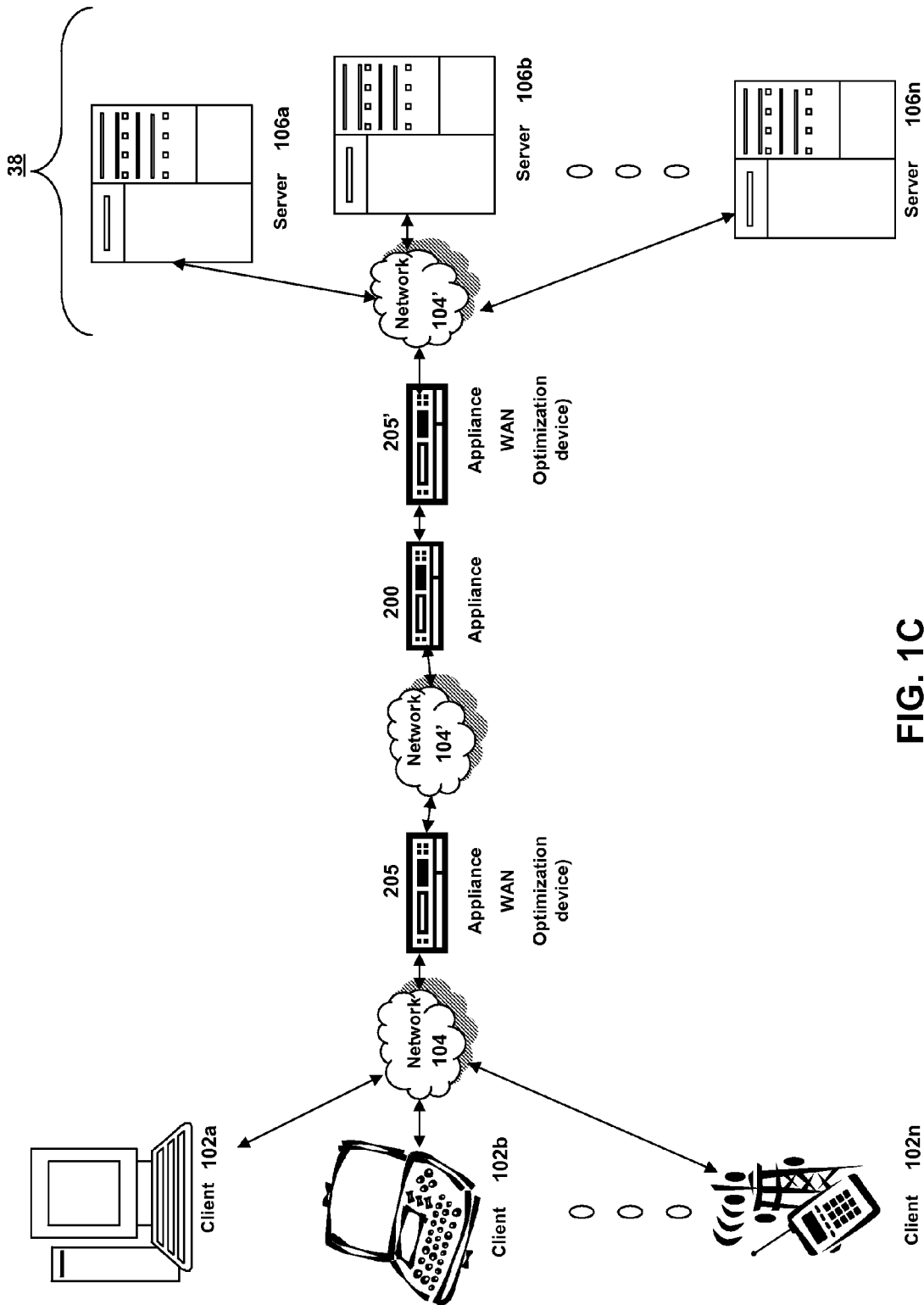
FIG. 1C is a block diagram of an embodiment of an environment for delivering a computing environment from a server to a client via a plurality of appliances.

Referring now to FIG. 1C, another embodiment of a network environment deploying the appliance 200 with one or more other types of appliances, such as between one or more WAN optimization appliances 205, 205' is depicted. For example, a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'.

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and/or form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and/or form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
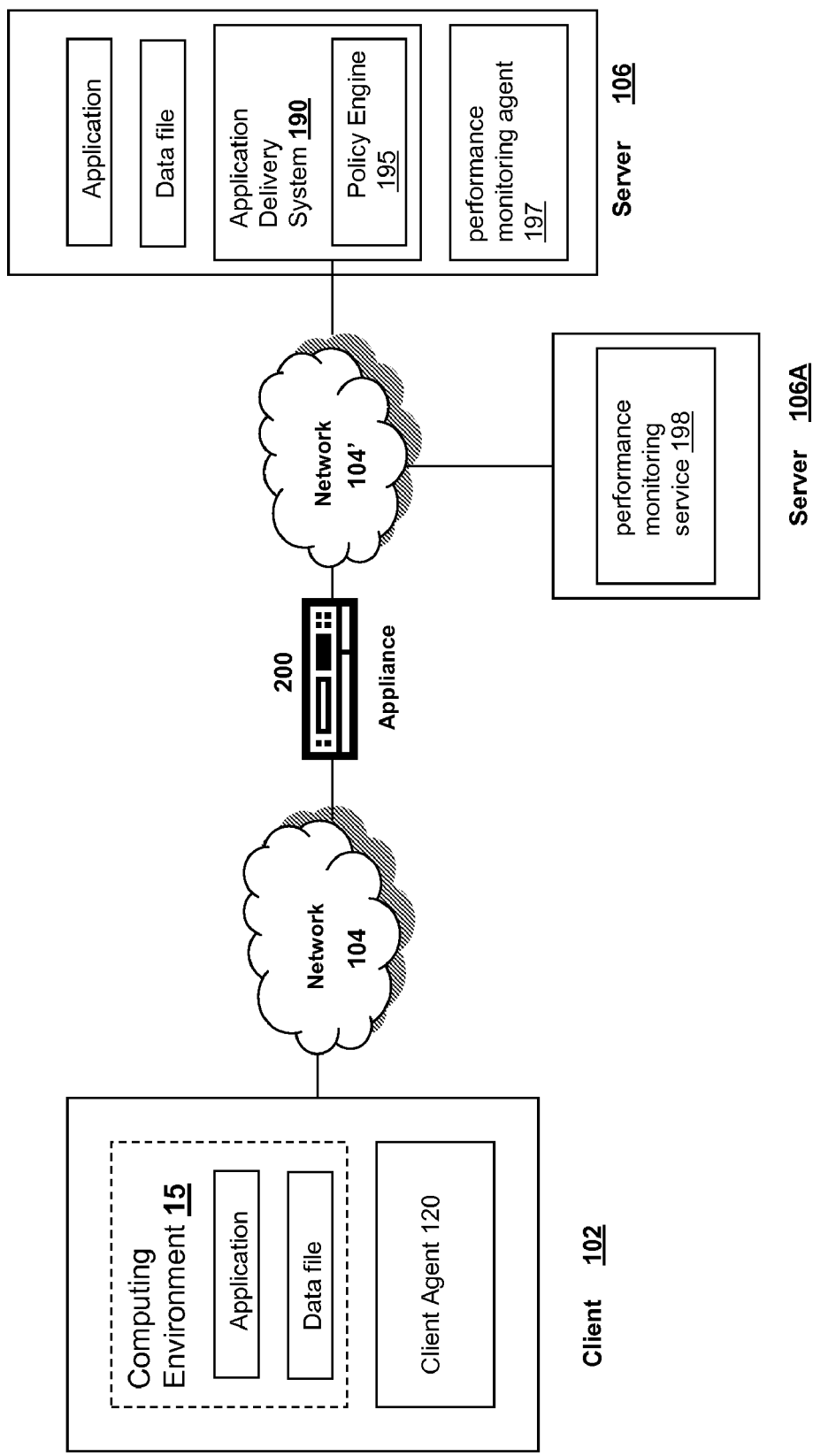
FIG. 1D is a block diagram of an embodiment of an environment for delivering a computing environment from a server to a client and having a performance monitoring service.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. In yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via streaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiment, the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which, for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and/or form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiment, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
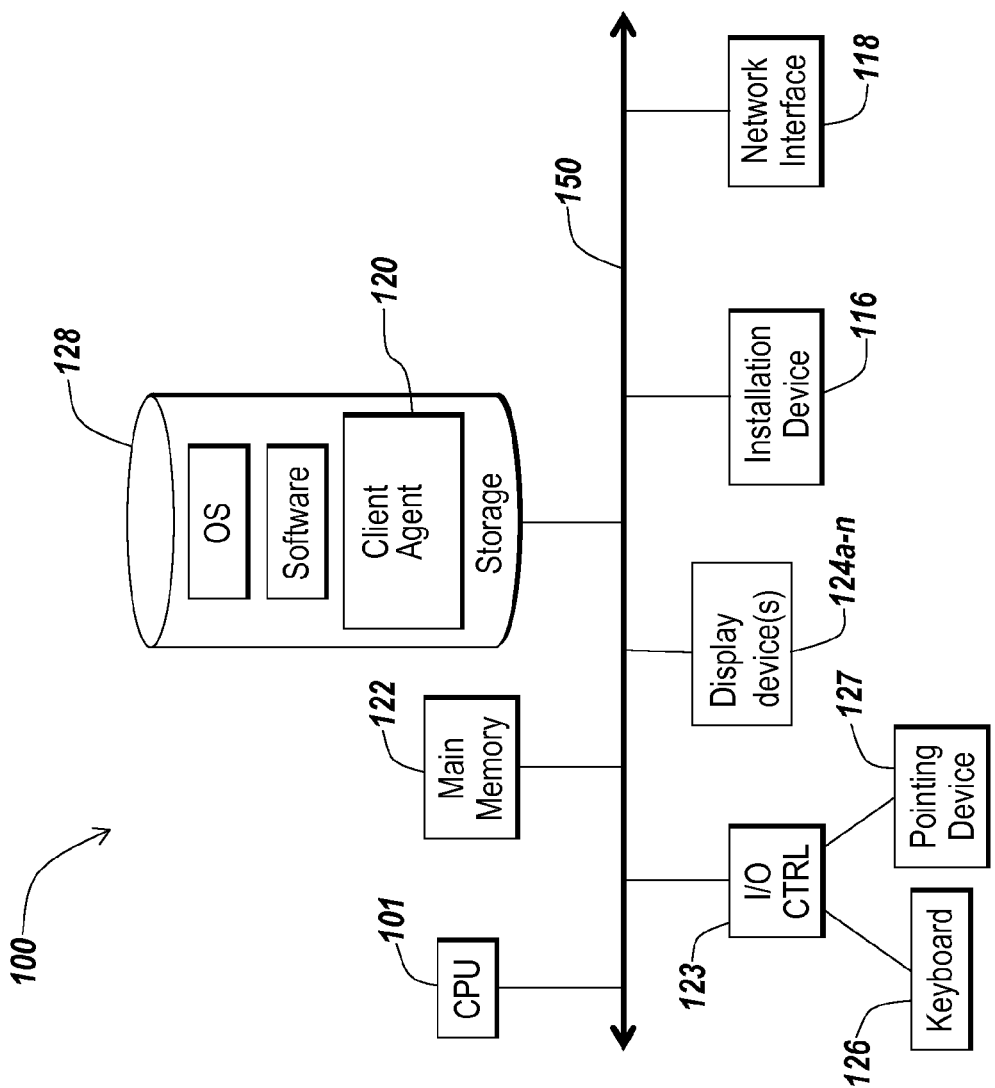
FIGS. 1E and 1F are block diagrams of embodiments of a computing device.
Figure 1F:
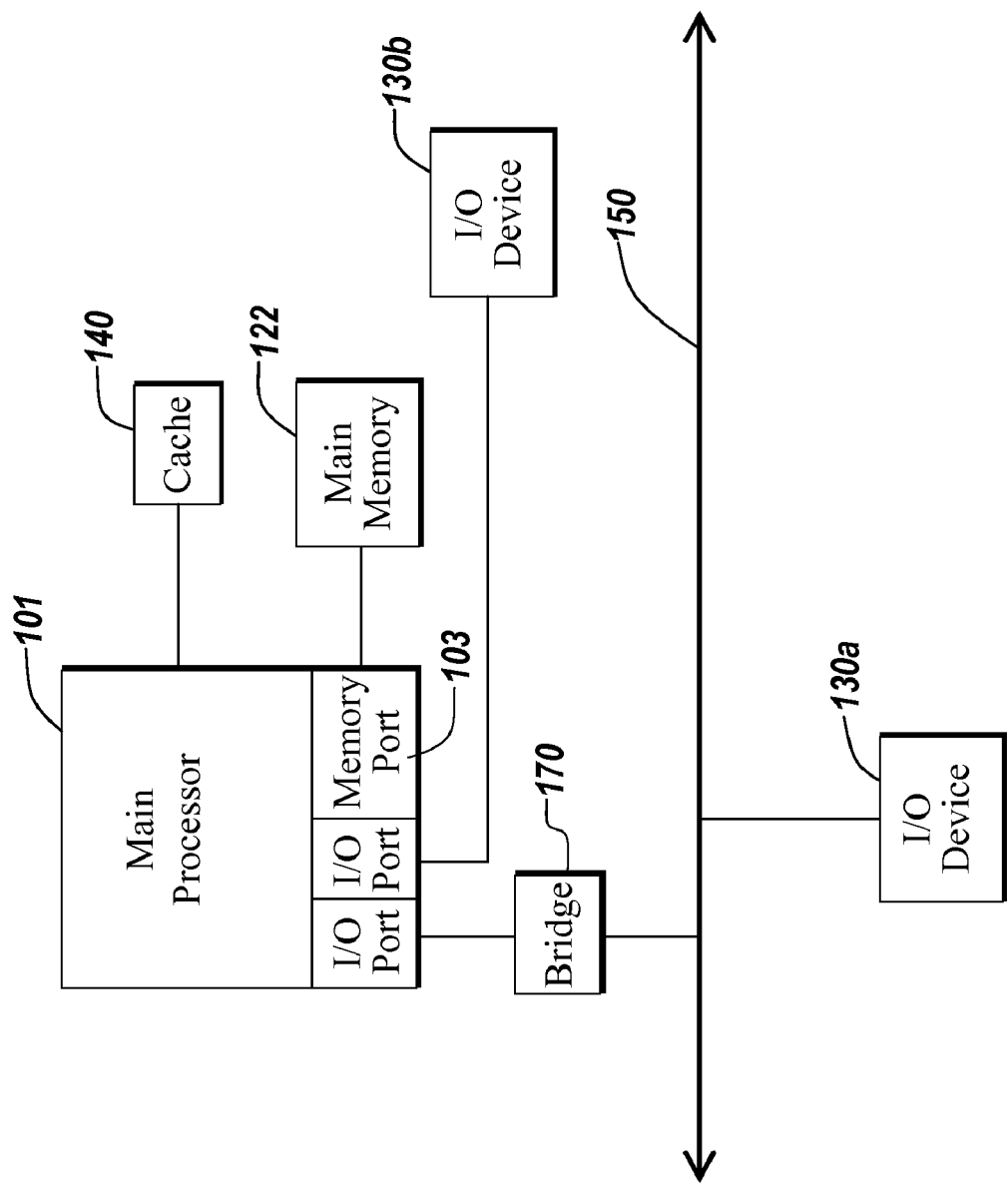

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via HyperTransport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operates under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
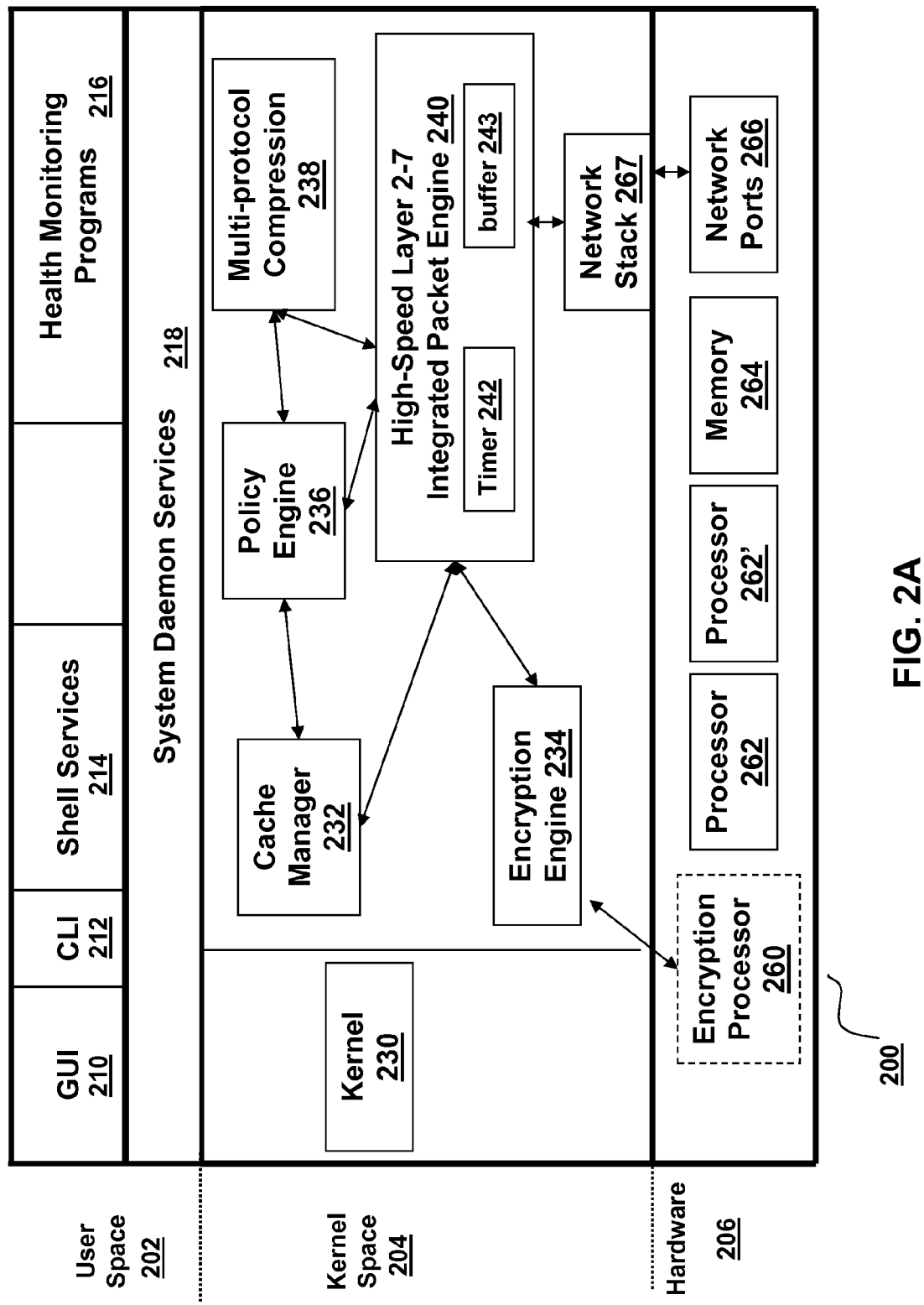
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of UNIX operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any realtime operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element comprises a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260. The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
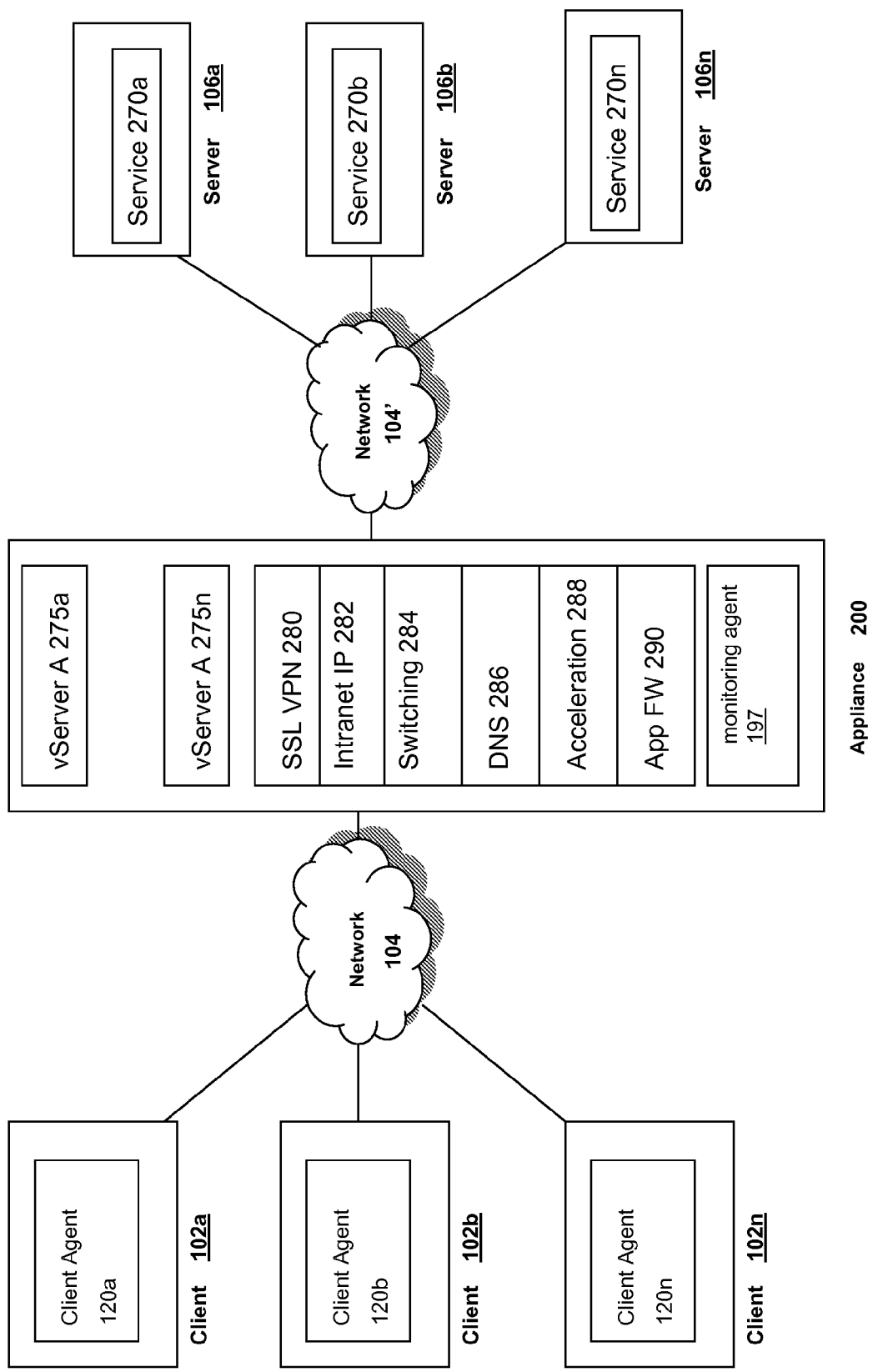
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 1908 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
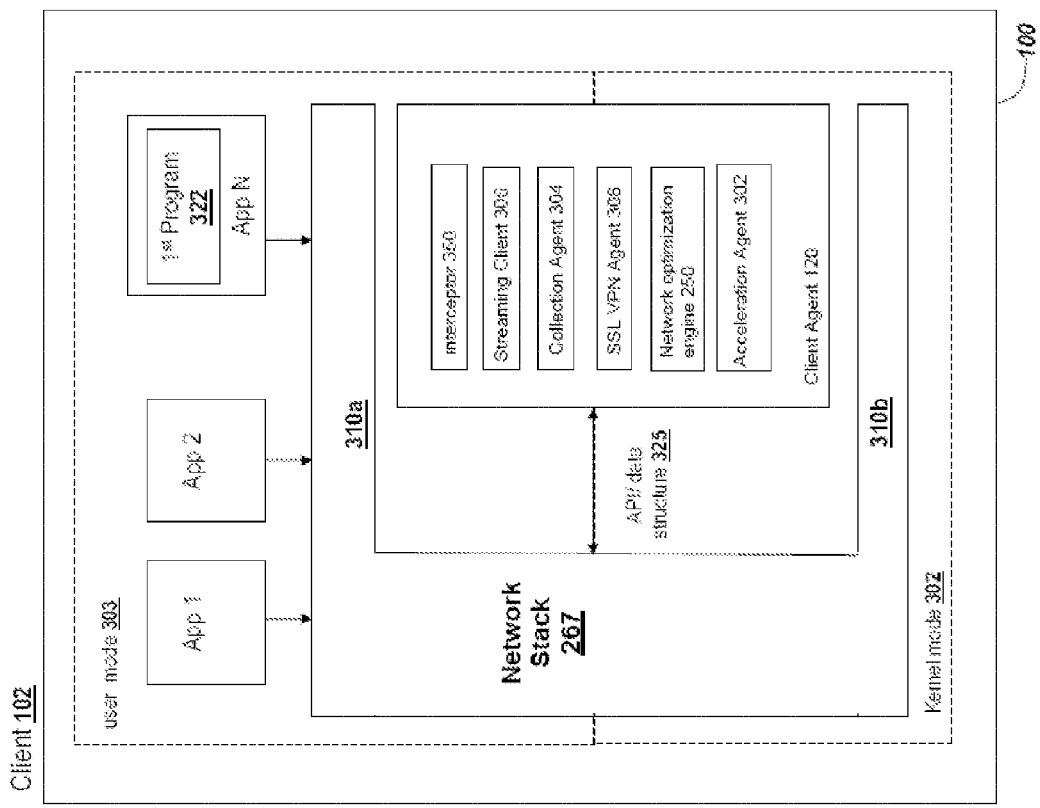
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

The streaming client 306 comprises an application, program, process, service, task or executable instructions for receiving and executing a streamed application from a server

106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 129 monitors and measures performance of any portion of the client agent 120. For example, in some embodiments, the monitoring agent 129 monitors and measures performance of the acceleration program 302. In another embodiment, the monitoring agent 129 monitors and measures performance of the streaming client 306. In other embodiments, the monitoring agent 129 monitors and measures performance of the collection agent 304. In still another embodiment, the monitoring agent 129 monitors and measures performance of the interceptor 350. In some embodiments, the monitoring agent 129 monitors and measures any resource of the client 102, such as memory, CPU and disk.

The monitoring agent 197 may monitor and measure performance of any application of the client. In one embodiment, the monitoring agent 129 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

D. Cookie Management

Figure 4A:
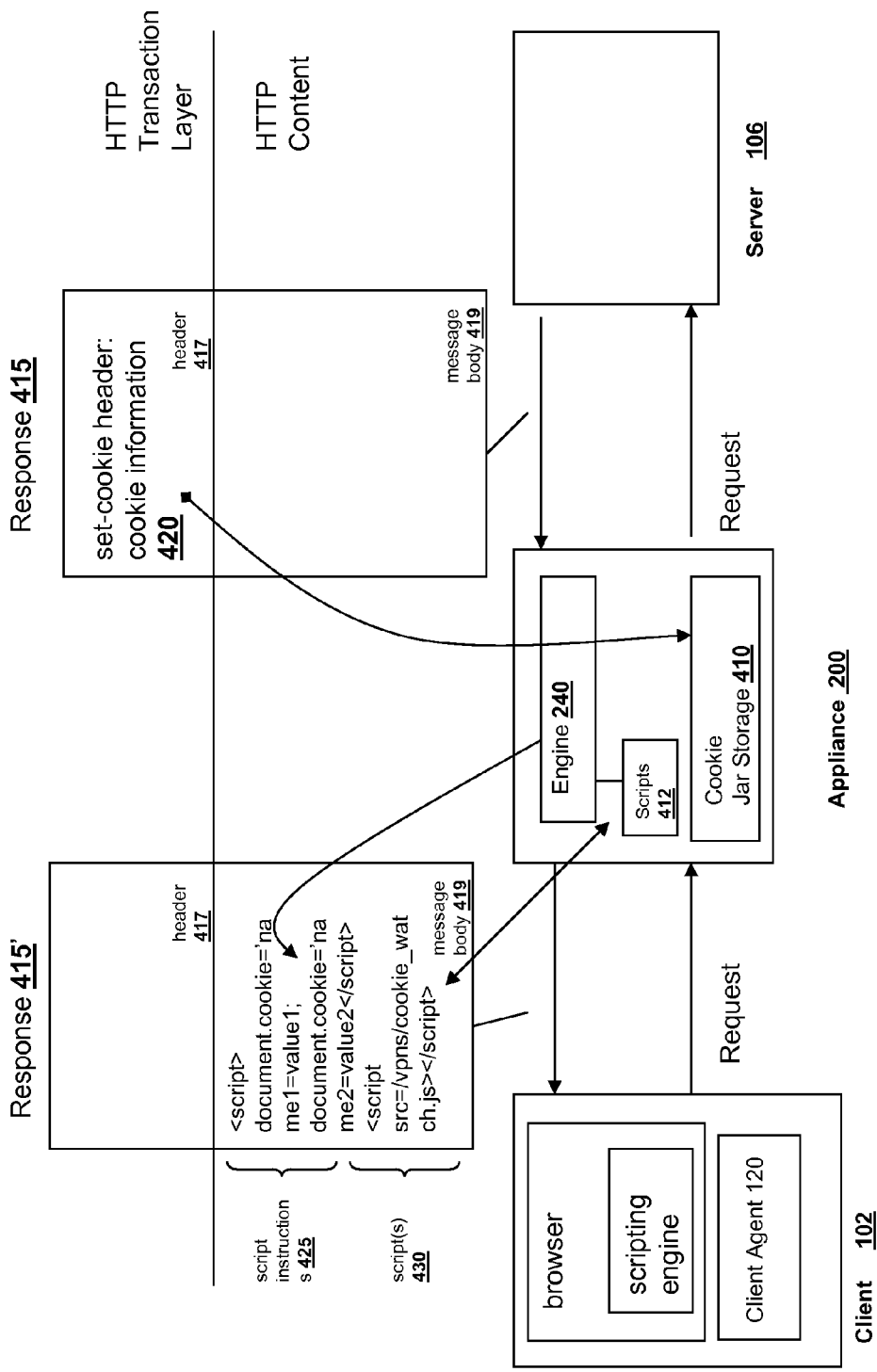
FIG. 4A is a block diagram of an embodiment of a system for managing browser cookies in a content layer of an HTTP transaction.

Referring now to FIG. 4A, an embodiment of a cookie management system is depicted. In this embodiment, an intermediary, such as an appliance 200 or client agent 120, may manage cookies for a browser using the content or body of an HTTP response instead of the set cookie-header or transaction layer. The cookie management system of FIG. 4A maintains cookie information for a browser via an intermediary and provides the correct cookie parameters in the browser via the HTTP content layer. Set-cookie headers served from a server in response to client HTTP requests are removed by the intermediary. A cookie jar of the intermediary may store configured cookies to be used by the intermediary for the clients, such as in accordance with a policy. In some cases, cookie information from the removed headers may be stored in a cookie jar on the intermediary. The intermediary delivers instructions and scripts via the content layer of the HTTP response to set the cookie in the browser based on the cookie information stored in the intermediary. The scripts detect browser changes to the cookie and communicate the changes to the intermediary to update the cookie jar.

In brief overview of the system of FIG. 4A, a client 102 may include a browser having a scripting engine. The client via the browser may request content from a server 106, such as an HTTP server. The request may traverse an appliance 200, acting as a proxy or intermediary between the client and the server. The server may communicate a response 415 to the client request. The response 415 may include a header portion 417 and a message body 419 portion. The server 106 may set one or more cookies via the header of the HTTP transaction, such as using the set-cookie header 417. The set-cookie header may include cookie information 420 such as name-value pairs and domain and path names. The appliance 200 receives the response 415 and removes the set-cookie header 420 from the response 415. The appliance may store the cookie information 420 in a storage 410, referred to as a cookie jar.

The engine 240 of the appliance 200 inserts script instructions 415 and scripts 430 to form a modified response 415' forwarded to the client 102. The script instructions 425 set the cookie in the browser in accordance with configured cookies or cookie information 420 in the cookie jar 410. The script 430 provides or identifies a script for detecting changes to the cookie and reporting the changes to the appliance 200. The browser receives the response 415' and executes the content of the body message 418 of the response 415'. This sets the cookie in the browser in accordance with the maintained or configured cookie information of the cookie jar 410. The browser loads the scripts 430 which execute upon one or more events that may change the information of the cookie. In response to detecting such changes, the scripts may transmit the changes to the appliance for updating the cookie jar 410.

The client 102 may include any embodiments of the client agent 120 previously described in conjunction with FIG. 3. The client may include any type and form of user agent. A user agent may be a browser, editor, spider (web-traversing robots), or any other end user tool or program. The client 102 may include any type and form of browser. In one embodiment, the browser is any version of Internet Explorer manufactured by Microsoft Corporation of Redmond, Wash. In another embodiment, the browser is any version of the Netscape browser manufactured by the Netscape Communications Corporation. In other embodiments, the browser is any version of the open source browser referred to as Firefox and provided by Mozilla Foundation of California and found at www.mozilla.com. In yet another embodiment, the browser is any version of the browser referred to as Opera manufactured by Opera Software ASA of Oslo, Norway. In some embodiments, the client 102 executes or includes any type and form of application or program for displaying web pages, web content or HTTP content.

In one embodiment, the client 102 may execute a remote display client, such as an ICA client manufactured by Citrix Systems, Inc or a Remote Desktop Protocol manufactured by the Microsoft Corporation. In these embodiments, a server 106 may execute the browser on behalf of the client and display output from the browser on the client 102 via a remote display protocol, such as ICA or RDP, to a remote display client agent 120. The client 102 via the browser, an application or remote desktop client may display one or more pages, such as any web or HTTP page or content, served from a server 106. The page or pages may include or more objects. The page or pages may identify one or more objects. For example, a page may identify an object via a URL or hyperlink.

The browser may include any type and form of scripting engine which may execute any type and form of scripts. The scripting engine may support and execute any implementation, dialect or version of the ECMAScript standardized by Ecma International in the ECMA-262 specification. In one embodiment, the scripting engine supports and executes Java Script. In another embodiment, the scripting engine supports and executes Microsoft's implementation of the ECMAscript standard referred to as Jscript. In one embodiment, the scripting engine operates with Jscript .Net. In some embodiments, the scripting engine supports and executes VBscript.

The appliance 200 may include any embodiments of the packet processing engine 240 previously described in connection with FIG. 2A. The engine 240 may process packets communicated between a client and a server. The engine 240 may receive requests from a client, modify the requests and forward the modified requests to a server. The engine 240 may receive responses from a server, modify the responses and forward the modified responses to the client. In some embodiments, the engine 240 is HTTP aware and understands how to access/read HTTP transactions and modify the HTTP transaction in accordance with the policies, design and construction of the appliance 200. In one embodiment, the engine 240 is constructed, designed or adapted to perform any of the cookie management operations or techniques described herein.

The engine 240 may access one or more scripts 412 stored in or accessible by the appliance 200. The scripts 412 may be stored as data within the engine 240 such as via objects or data structures. In some cases, the scripts 412 are stored in one or more memory elements. In other cases, the scripts 412 are stored to disk. In one embodiment, the scripts are accessible via the network 104 from another computing device, such as a server 106. In some embodiments, the engine 240 accesses the scripts via disk or the network and loads the scripts into memory. In some embodiments, the engine 240 requests the script from a server.

The appliance 200 may include any type and form of storage element 410 for storing or providing storage for cookie information. This storage element may be referred to as the cookie jar 410 as a plurality of cookies from one or more servers for one or more clients may be stored to this storage element. In some embodiments, the storage element 410 may comprise memory, such as a data structure or object. In other embodiments, the storage elements 410 may include one or more files or a database. The scripts 412 may include contents of one or more scripts, such as the executable instructions. The script 412 may include URLs or locations to other scripts or portions of scripts, such as functions.

The appliance 200 and/or engine 240 may store cookie information into the cookie jar 410 in any arrangement, layout, format, relationship or combination. In some embodiments, the engine 240 stores cookie information in the cookie jar 410 based on type of cookie. In other embodiment, the engine 240 stores cookie information in the cookie jar 410 in association with a service or server. In another embodiment, the engine 240 stores cookie information in the cookie jar 410 in association with a type of service, appliance or server. In one embodiment, the engine 240 stores cookie information in the cookie jar 410 in association with a user or group of users. In yet another embodiments, the engine 240 stores cookie information in the cookie jar 410 in association with a URL. The engine 240 may store cookie information in the cookie jar 410 in associate with a domain name, a host name or other network identifier, such as an IP address. In one embodiment, the engine 240 stores cookie information in the cookie jar 410 based on the cookie header, or any portion thereof.

The engine 240 may use any type of indexing, key, or other relationship scheme to query or find any cookie information in the cookie jar 410. In some embodiments, the engine 240 may encode cookie information 420 obtained from a response 415 in any manner to store in the cookie jar 410. The engine 240 may parse any information from a header 417 to obtain name-value pairs of the cookie information 420. In other embodiments, the engine 240 may perform any type and form of hash function on the cookie information 420 or any portion thereof for storage and retrieval from the cookie jar 410. In one embodiment, the engine 240 may store the cookie information 420, encoded or otherwise, in a cache. In some embodiments, the engine 240 uses the cookie jar 410 as a cache or as a compression history. In another embodiment, the engine 240 stores compressed cookie information in the cookie jar 410.

The cookie jar 410 may include any type and form of configured cookies to be used for a client. For example, an administrator of the appliance may configure one or more cookies to be used by a user or a client. In some cases, the administrator configures cookie information in the cookie jar 410 to provide a cookie for a predetermined application. In other cases, the administrator configures cookie information in the cookie jar 410 to provide a cookie for a predetermined group of users. In one case, the administrator configures cookie information in the cookie jar 410 to provide a cookie for users of an SSL VPN connection. In various embodiments, the administrator configures cookie information in the cookie jar 410 to provide cookies to clients instead of using cookie information from the server. For example, the administrator may configure cookies in the cookie jar to replace or use instead of any server provided cookies.

Still referring to FIG. 4A, the responses 415, 415' depicts a transaction layer and a content layer of an HTTP transaction. In an embodiment of HTTP, a request and/or response may include a header 417 and a message body 419. The header portion 417 of the response may be directed to transactional information and directives, such as caching, cookie setting, language, character encoding, allowed methods, authorization, etc. The message body or content layer 419 of the HTTP response includes the message body or body 419 of a request and/or response is used to carry the entity-body associated with the request or response. The server may serve up content, such as web pages, URLs, file or other requested resource. An HTTP message may have a body of data sent after the header lines. In a response, the body 419 is where the requested resource is returned to the client or perhaps explanatory text if there's an error. In a request, the body 419 is where user-entered data or uploaded files may be sent to the server.

A server or a client 102, such as a browser, may have rules for handling header information at the transaction layer. For example, the server and the client may manage state and state information using any cookie and set-cookie header 417. Upon receiving an HTTP response, a browser may keep track of state information that arrives via the set-cookie header 417 provided by a server. If the cookie set by the header does not follow predetermined cookie rules, the browser may reject any cookies or not store and/or keep track of cookie information. For example, the browser ignores any attribute-value pairs of the set-cookie header 417 the browser does not recognize. A browser may have security or other cookie settings to prevent possible security or privacy violations and may reject cookies set via the set cookie header that does not meet these settings. In some cases, the browser has rules regarding cookie management via headers directed towards limiting the set of servers for which a cookie is valid. The rules may reject or accept cookies via the cookie header based on the values of the path, domain, and port attributes and/or the request-URI, request-host and request-port.

Some example of browser rules for rejecting or accepting cookies via the transaction layer or headers of an HTTP transaction include: 2) rejecting the cookie via the set-cookie header if the version attribute is missing, 2) the value for the path attribute is not a prefix of the request-URI, 3) the value for the domain attribute contains no embedded dots, and the value is not .local., 4) the effective host name that derives from the request-host does not domain-match the domain attribute, 5) the request-host is a host domain name, HDN (not IP address), and has the form HD, where D is the value of the domain attribute, and H is a string that contains one or more dots and 6) the port attribute has a list of ports, and the request-port was not in the list. The browser may also include limits on the number of cookies for a server.

An intermediary, such as the appliance 200 or a client agent 120, may remove the set-cookie header 420 of a response 415 and forward the modified response 415' to the requester, such as the client 102. In some embodiments, by removing the set-cookie header from the transaction layer the cookie and state management rules of the browser, user agent or client for the transaction layer are bypassed and/or avoided. If the response 415' received by the requester or client does not have any set-cookie headers 420 in the header portion 417, the requester, such as the browser, may not perform any cookie or state management based on the response.

In one embodiment, the intermediary obtains, stores and maintains the cookie information 420 identified and/or removed from the header 417 of the response 415 to the cookie jar 410. The intermediary may maintain this cookie information in the cookie jar on behalf of or for any user agent, browser or client. The intermediary may maintain this cookie information outside of the transaction layer of the HTTP response. Furthermore, the intermediary may set or otherwise provide this cookie information to the user agent, browser or client outside or external to headers 417 or transaction layer of a request or response. Although the server may set the cookie via the header 417, the intermediary removes the cookie header from the response and sets and manages the cookie external to the header 417. For example, in some embodiments, the intermediary sets and manages the cookie via the message body or content layer of the request/response.

In some embodiments, the intermediary does not store or maintain the cookie information 420 identified and/or removed from the header 417 of the response 415. For example, the intermediary may remove and ignore cookies served from the server, and manage and set client-side cookies based on configuration and policy of the intermediary. The intermediary may remove the set-cookie header(s) from the response 415 to prevent cookie management at the HTTP transaction layer. The intermediary may desire to use the cookie information configured or maintained by the intermediary, such as in the cookie jar 410, instead of the information set by the server via the set-cookie header. In one embodiment, the intermediary may determine not to provide a cookie or a set a cookie on the client, even if the server provided a set-cookie header. For example, the intermediary may not provide or set a client-side cookie for a Microsoft Outlook Web Access application. In another embodiment, the intermediary may determine to provide an intermediary configured or predetermined cookie instead of the server cookie provided via the set-cookie header. For example, the intermediary may use intermediary configured cookie information or profiles to set the cookie on the client-side for a Web Interface application of Citrix Systems, Inc. The intermediary may determine whether or not to set the cookie on the client based on a policy of a policy engine. The intermediary may also determine which cookie information to set on the client based on a policy of a policy engine.

As depicted in the embodiment of the appliance 200 as an intermediary in FIG. 4A, the appliance 200 sets and manages the cookie via the message body 419 portion of the response 415, 415'. The engine 240 may insert, modify or otherwise include in body 419 of the response 415' one or more scripts instructions 425 to set the cookie in the browser via one or more APIs. The script instructions 425 may include any type and form of scripts programming language already discussed herein. The script instructions 425 may set any one or more of the attribute-value pairs for a cookie. The script instructions 425 may set the values of the cookie in accordance with the cookie information 420 removed from the header 417 and stored in the cookie jar 417. By way of example and in no manner limiting, the scripting instructions 425 may use the document.cookie property and API such as via the following instructions:

<script>
document.cookie='name1=value1';
document.cookie='name2=value2'</script>/.

The script instructions 425 may set the domain, path and any port related attributes of the cookie. The cookie inserted on the client/browser via the script instructions 425 may be set correctly to host, domain and content path requested. In some embodiments, the script instructions 415 identify one or more scripts 412 available on the intermediary or via the network to set the attribute-values of the cookie.

The intermediary may determine the names and values for these instructions 425 in accordance with any policies, such as content rewriting policies or rules, such as content rewriting rules. For example, the intermediary may rewrite content for traversing between a first network, e.g., public network, and a second network, e.g., private network, of an SSL VPN connection between the client and server. Any portion of the cookie may be set via the instructions 425 to set values and information to support any of the functionality of the appliance 200 and/or client agent described herein, such as those embodiments described in connection with FIG. 2A-2B or FIG. 3.

The appliance 200 may also provide via the body 419 of the response 419 one or more scripts 430 to manage the cookies within the context of the browser or user agent of the client. The engine 240 may insert, modify or otherwise include in body 419 of the response 415' one or more scripts 430 to manage any changes to the cookie. In one embodiment, the script 430 identifies or directs the browser to obtain and load a script from a location, such as storage 412. For example, the script 430 may identify the source of the scripts via a URL. Responsive to one or more events of the browser or user agent, the script 430 may determine if there are any changes to the cookie set via the instructions 425, such as an addition, deletion or modification to the cookie. For example, the script 420 may trigger any property change events that change a cookie. In another example, the script 430 may trigger on or detect any unload events. The script may delete or de-establish the cookie upon an unload event. In some cases, the script 430 may trigger on or detect any document attach events. In another embodiment, the script 430 may poll the value of the cookie to determine if there are any changes to the cookie since the cookie was set via the script instructions 425. In these embodiments, the script 430 may execute on a predetermined frequency. In some of these embodiments, the script 430 may poll the values of the cookie to detect changes based on detection or triggering of an event. Other embodiments of the script 430 for updating the cookie jar 410 will be discussed below in conjunction with FIGS. 5A-5B.

Although the script is generally described for detecting changes to the cookie made by the browser, this may include any components, libraries, scripts, controls, applets or other programs and scripts loaded or managed by the browser or otherwise executed on the client. The browser may make changes to a cookie based on executing or operating any of these types and forms of executable instructions regardless if provided by an intermediary or not. When the browser is generally discussed as executing, the execution may include running or operating any of these types of and forms of executable instructions, in the context of the browser or external thereto. Any of these executable instructions or applications on the client-side may use cookies as a communication mechanism or channel or otherwise to store or transmit state. The script 430 may used to detect and manage any of these cookies or cookie changes from any of these client-side executable instructions or applications. By doing so, the present solution may continue to support these applications and executable instructions while performing any of the operations described herein.

Upon detecting or determining a change to the cookie, the script 430 may communicate these changes to the intermediary using any communication mechanism and format. In one embodiment, the script 430 transmits a message to the intermediary via a transport layer connection. In another embodiment, the script 430 transmits the message to the intermediary via an HTTP based message or transaction. In other embodiments, the script submits or otherwise includes these changes via any communication of the browser or another program on the client to the server or intermediary.

In some embodiments, the script 430 encodes the changes in a cookie. In one embodiment, the script 430 creates a second cookie to specify the changes. In some embodiments, the script 430 encodes the cookie (and/or second cookie) with any data or meta information not present in a standard HTTP cookie header. For example, the script may encode information in a value of any attribute to represent the data or meta information for these changes. The script 430 may attach the cookie having these changes to any request from the browser. The script may include the cookie having these changes in any communication from the client traversing the intermediary. The intermediary may detect this cookie and the encoded changes therein. The intermediary may update the cookie jar with the changes to the cookie.

Although the cookie management techniques are generally described in the context of HTTP requests and responses, the techniques of the present solution may be used with any protocol. Furthermore, although generally described in the context of an appliance as the intermediary, any of the functions, operations and methods of the appliance may be deployed via the client agent 120. For example, the client agent 120 may include the engine 240 or any portion thereof for performing any of the operations described herein. The client agent 120 may also include and manage the cookie jar 410 as well as maintaining any cookie management scripts 412.

Figure 4B:
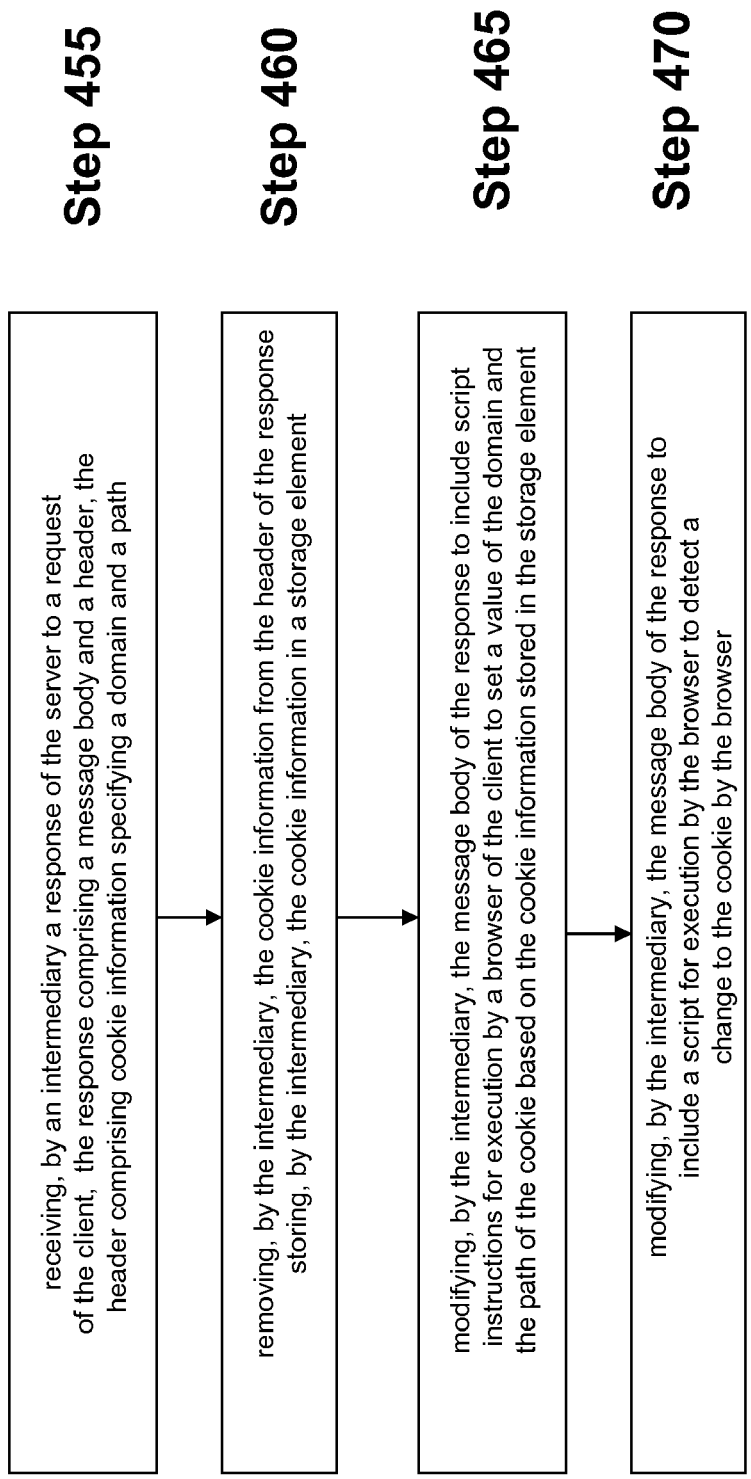
FIG. 4B is a flow diagram depicting an embodiment of steps of a method for managing browser cookies in conjunction with FIG. 4A.

Referring now to FIG. 4B, an embodiment of steps of a method for providing cookie management by an intermediary via the content layer of the response is depicted. In brief overview of method 450, at step 455, the intermediary receives a response from the server to a request of the client. The response includes a header and a message body. The header includes a set-cookie header, for example, setting the domain and path of the cookie. At step 460, the intermediary removes the set-cookie header from the response. The intermediary may store the cookie information from the header into a storage element, such as the cookie jar 410. At step 465, the intermediary modifies the message body of the response to include script instructions. The script instructions and/or script set the value of the cookie via the message body based on cookie information stored in the cookie jar, which may include any configured cookies. At step 470, the intermediary modifies the message body of the response to include a script for detecting any changes to the cookie.

In further details of step 455, the intermediary may receive any type and form of response 415 from the server. In some embodiments, the intermediary may server a response on behalf of the server, such as a via a cache of the appliance. The intermediary may receive an HTTP response to an HTTP request. In another embodiment, the intermediary may receive a response comprising XML or any other markup language. In one embodiment, the response includes a header 417 without a message body 419. In another embodiment, the response 415 includes a plurality of headers 417. In other embodiments, the intermediary receives a response have multiple cookie headers. In various embodiments, the intermediary may receive a response having headers other than a cookie related header. In one embodiment, the intermediary receives a response having a cookie header and a non-cookie related header. In yet another embodiment, the intermediary receives a response 415 that includes a script or script instructions. In one embodiment, the intermediary receives a response 415 that includes script instructions 425 and/or script 430. The intermediary may receive via the header or transaction layer of the response 415 any type and form of cookie information. In one embodiment, the intermediary receives a set of one or more attribute-value pairs for the cookie. In some cases, the intermediary receives values for a domain, host, path and/or port for the cookie.

In some embodiments, the intermediary consumes (e.g., removes) all set-cookie headers served from the server. In other embodiments, the intermediary consumes set-cookie headers served from the server based on the type or name of the application. For example, the intermediary may consume set-cookie headers of a first application while leaving intact the set-cookie header for a second application. In another embodiment, the intermediary consumes set-cookie headers served from the server based on the user. In one embodiment, the intermediary consumes set-cookie headers served from the server based on the user. In yet another embodiment, the intermediary consumes set-cookie headers served from the server based on one or more policies.

At step 460, the intermediary identifies the cookie information 420 in the header portion 417 of the response 415. The intermediary may remove the cookie information from the response 415. In some embodiments, the intermediary removes the one or more set-cookie headers from the response. In one embodiment, the intermediary removes the set-cookie header entirely. In another embodiment, the intermediary removes a portion of the set-cookie header. In other embodiments, the intermediary removes the attribute-value portions of the set-cookie header. In yet one embodiment, the intermediary removes all headers from the response. In another embodiment, the intermediary modifies the set-cookie header in the response 415' to disable the cookie or otherwise cause an error, be ignored or rejected when received by the requester.

The intermediary, such as via engine 240, may store the identified information of the cookie header to the cookie storage 410. The intermediary may encode the cookie information in any manner and store the encoded cookie information to the storage 410. In some embodiments, the intermediary stores the cookie information as script instructions 425, or a portion thereof. The intermediary may store the cookie information in association with any other information known by the intermediary. In one embodiment, the intermediary stores the cookie information in association with one or more of: the server, the client, the browser and/or the user. In other embodiments, the intermediary does not store or maintain the removed cookie information 420. Instead the intermediary may use configured or default information in the cookie jar. In another embodiments, the intermediary may choose not to provide any cookies to the client or the application.

At step 465, the intermediary modifies the message body of the response to provide a modified response 415' including instructions to set the cookie for the requester. In one embodiment, the intermediary modifies the message body of the response to include instructions 425 for setting the cookie in a context of the browser. In another embodiment, the intermediary modifies the message body of the response to include instructions 425 for setting the cookie in a context of a session. The intermediary may provide scripting instructions 425 in the body of the response to set a cookie in accordance with the cookie information maintained by the intermediary. In one embodiment, the intermediary may provide scripting instructions 425 to set the cookie in a manner corresponding to the set-cookie header received by the server. In yet another embodiment, the appliance 200 provides instructions to set the cookie in accordance with a configured cookie policy. In some embodiments, the appliance 200 provides instructions to set the cookie in accordance with any configured cookies of the appliance. In still one embodiment, the appliance 200 may not provide instructions to the client to set or establish the cookie. In another case, the appliance 200 provides instructions to the client that do not set or establish a cookie.

At step 470, the intermediary modifies the message body of the response to provide a modified response 415' including a script 430 to monitor and/or detect changes to the cookie provided by the appliance or otherwise to any client-side cookies. The intermediary may provide a script 430 in the response 415' to monitor and/or detect changes to a cookie in a context of the browser. In some cases, the intermediary may provide a script 430 in the response 415' to monitor and/or detect changes to a cookie in a context of a session. In one embodiment, the intermediary modifies the message body to provide an instruction to load the script 430 from an identified location. In other embodiments, the intermediary includes content of one or more scripts 430 in the modified response 415'. In some embodiments, the intermediary provides instructions via the message body for the scripting engine to load or use a script 430. In another embodiment, the appliance 200 provides instructions to the client agent 120 to monitor or detect changes to the cookie.

As will be discussed in more detail below, the browser of the client receives the modified response. Upon loading the message body of the response, the browser executes the script instructions to set the cookie in accordance with the values in the cookie jar maintained by the intermediary. The setting of the cookie is performed via the HTTP content layer instead of the header or HTTP transaction layer. This bypasses the browser cookie management rules upon receiving a set-cookie header. Upon loading the message body of the response, the browser may load or execute the script 430 for detecting and monitoring changes to the cookie.

Figure 5A:
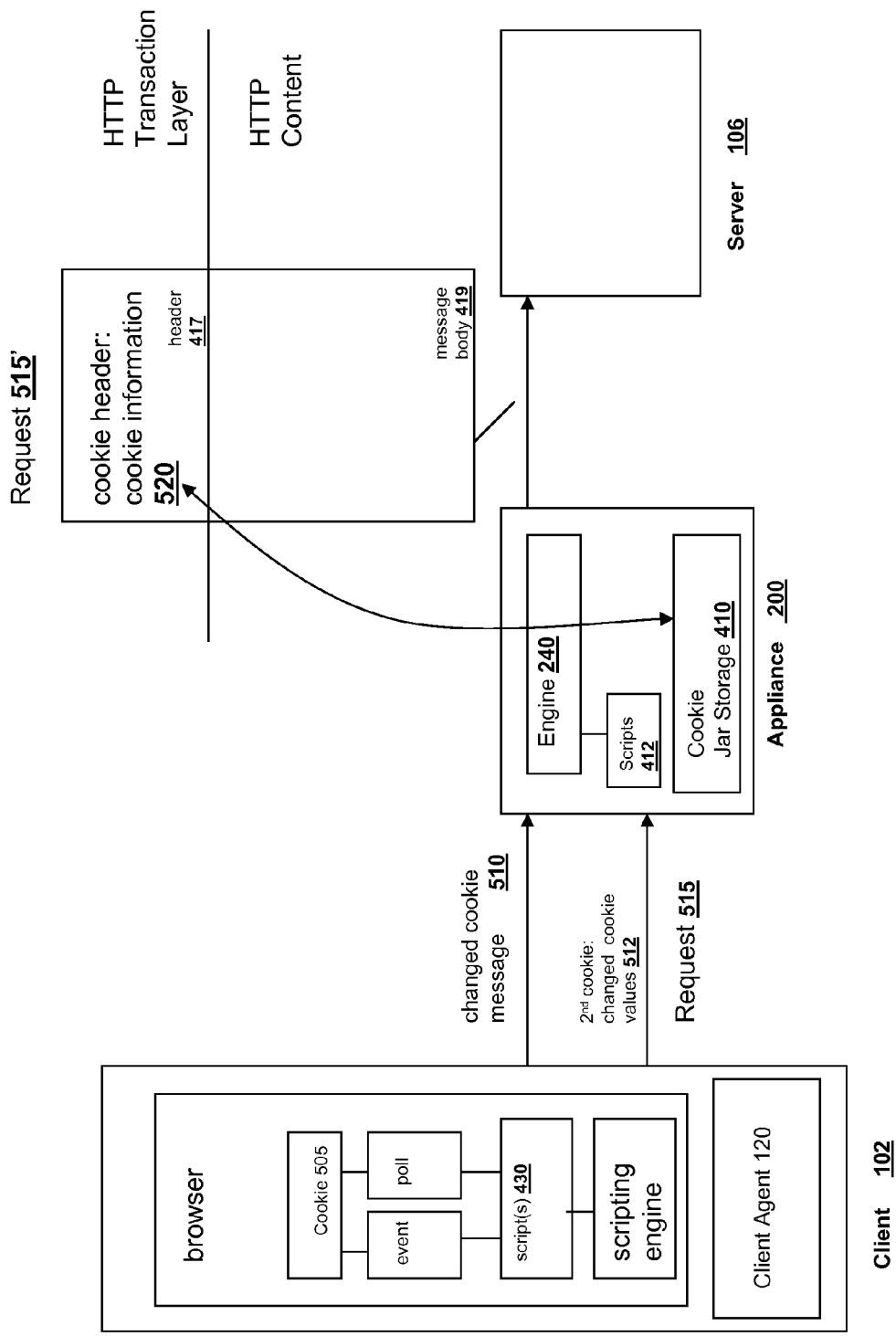
FIG. 5A is a block diagram of another embodiment of a system for managing browser cookies in a content layer of an HTTP transaction.

Referring now to FIG. 5A, an embodiment of a system for client-side management of cookies is depicted. In brief overview, the client 102 includes an embodiment of a client agent 120 and a browser. The browser includes a script engine for loading or executing one or more scripts. The browser may load or may execute a script 430 received from the intermediary, such as a script 430 delivered via a message body of a response. The script 430 may monitor the cookie 505 via events of the browser or via polling the cookie 505. The cookie may have been set or established via the content layer of a response. Upon detecting a change to the cookie, the script 430 may communicate the change to the intermediary, such as the appliance 200. The script 430 may communicate a message 510 to the intermediary. In another embodiment, the script 430 may provide a cookie 512 to indicate the changes to the cookie 505, such as encoding the cookie with change values. The intermediary may update the cookie jar 410 based on the changes communicated via message 510 or cookie 512.

Referring now to FIG. 5B, an embodiment of steps of a method for providing cookie management from a client-side perspective is depicted. In brief overview of method 550, at step 550, the browser of the client receives a response from a server. The response includes a message body and a header. The header may exclude cookie information, such as a set-cookie header. The message body of the response may include script instructions 425 and/or a script 430. The script 430 may be for monitoring and detecting changes to a cookie set by the script instructions 425 or for cookies set or established by client-side programs. At step 560, upon loading the message body of the response, the browser executes the script instructions 425 to establish the cookie 505. This sets the cookie in accordance with the cookie jar maintained by the intermediary. At step 565, the browser also loads or executes the script 425 from the response to monitor changes to cookies. At step 570, the script 430 detects a change to a cookie and communicates the change to the intermediary. At step 574, the intermediary may modify requests to the server to include cookie header information in the header 417 of the request based on values stored in the cookie jar 410.

In further details, at step 555, the client 102 receives a response from the server 106, such as the modified response 415' described in conjunction with FIGS. 4A and 4B. In some cases, the response 415' comprises a message body 419 and a header 417. In other embodiments, the response 415 comprises a message body 419 and no header 417. In another case, the response 415' comprises a plurality of headers 417. In these embodiments, one, more or all of these headers may not include cookie information. In one embodiment, the header of the response includes a set cookie header for a first cookie and the body of the response includes instructions 425 to establish a second cookie in the browser. In some embodiments, the intermediary removes all set-cookie headers from the response forward to the client 102. The client 102 may receive the script instructions 425 and the script 430 in the same response or different responses. In one embodiment, the intermediary may not send the script 430 if the intermediary knows or thinks the client 102 or browser already has the script 430.

At step 560, the client 102, client agent 120, browser or other user agent may load the body message of a response. Upon loading the body message 419 of the response, the cookie may be set on the client in accordance with the script instructions 425. In one embodiment, the browser executes the instructions 425 to establish the cookie. In some embodiments, the cookie is established in the context of the browser. In other embodiments, the cookie is established in the context of a session. The instructions may set one or more attribute-value pairs of a cookie 505. In some embodiments, the instructions set the domain, path and/or port attributes of the cookie in accordance with the appliance and/or the cookie jar 410. In another embodiment, the instructions are configured to set the attribute-value pairs, such as domain and path, in accordance with any content management or content rewriting rules of the appliance 200. In one embodiment, the instructions are configured to set the attribute-value pairs in accordance with any policies of a policy engine of the appliance 200 or a server. For example, the instructions may establish a cookie for the browser based on a configured cookie or default profile of the appliance.

At step 565, the client 102, client agent 120, browser or other user agent may load or execute the script 430. The script may be loaded or executed at any time. In one embodiment, the script is loaded or executed upon receipt of the response. In another embodiment, the script is loaded upon a predetermined event. In some embodiments, the script is executed upon a predetermined event. In other embodiments, the intermediary transmits a signal to the client, such as via client agent 120 or browser, to load or execute the script. In another embodiment, the browser loads the script upon startup. In one embodiment, the browser loads or executes the script responsive to executing or completing the execution of script instructions 425. In yet another embodiment, the scripting engine, the client agent or the browser executes the script on a predetermined frequency.

The script 430 may detect one or more changes to the cookie 505. In one embodiment, the script 430 detects the creation, addition, deletion or modification of any cookie. The script may detect changes to any cookie of the browser regardless if set via the technique of the intermediary or otherwise. In another embodiment, the script 430 detects a change to the cookie 505 or any other cookie made via the browser, such as via any cookie and state management functionality of the browser. In some embodiments, the script is executed upon an event related to a change to a cookie or cookie management. In other embodiments, the script is executed upon any type of event and checks during execution if any value or information of a cookie has changed. In another embodiment, the script determines the browser added an attribute-value pair of a cookie. In some embodiments, the script determines the browser modified a value of an attribute-value pair of a cookie. In other embodiments, the script determines the browser deleted any portion of a cookie. In yet further embodiments, the script monitors and determines changes for a plurality of cookies.

At step 570, the script may communicate or cause to communicate information to the intermediary regarding changes to a cookie. In some embodiments, the script 430 may generate and transmit a message 510 to the intermediary. The message may encode or otherwise indicate changes to a cookie, such as cookie 505, such as additions, modifications or deletions. In one embodiment, the script 430 transmits the message 510 via a transport layer connection to the intermediary. In some embodiments, the script 430 uses an application layer protocol to communicate the changes to a cookie. In another embodiment, the script 430 creates a set-cookie header message and transmits this message to the intermediary via an HTTP based protocol. The script may encode the detected cookie changes in a cookie, such as cookie 505 or a second cookie 512. In some embodiments, the browser transmits the second cookie to the intermediary with a request 515, such as a subsequent request of the browser or client.

Upon receipt of a message, such as message 510 or cookie 512, indicating a change to the cookie 505, the intermediary updates the cookie jar 410 with the changes. In some embodiments, the intermediary receives multiple messages 510 and/or 512 and updates the cookie jar one at time based on each message. In other embodiment, the intermediary may update the cookie jar with the last message received if receive multiple messages within a certain time period. In another embodiment, the intermediary determines the changes indicated in the message are already stored in the cookie jar 410. In these embodiments, the intermediary may not take any further action with respect to the message. In yet another embodiment, the intermediary may determine the changes are for a cookie not yet stored in the cookie jar. In response to the determination, the intermediary may create and store a record in the cookie jar for the cookie represented by the changes of any of the messages 510 and/or 512.

At step 575, the intermediary may modify any requests to the server to include cookie information based on the information stored in the cookie jar 410. In some embodiments, the browser of the client 102 transmits a request 515 using the cookie 505 established for the browser. In other embodiments, the browser of the client 102 transmits a request 515 having any cookies created or changed by the browser. In other embodiments, the browser transmits a request not having a cookie or a cookie header. The intermediary may intercept or otherwise receive the request 515. The intermediary modifies the request to include cookie header information 520 and forwards the modified request 515' to the server. The intermediary may modify the header 417 of the request to include cookie information based on cookie information of the request from the client, cookie information in the cookie jar 410, policies of the intermediary, configuration of the intermediary or any combination thereof.

In this manner, the intermediary maintains for the server the cookie information in the header or transaction layer of the request. The intermediary may keep the content-based cookie management technique transparent to the server. Furthermore, the intermediary may maintain or set cookies in the content layer of HTTP for the client in accordance with any policies or functionality of the intermediary while maintaining any cookies of any client-side applications for transmission to the server. Cookie management of the intermediary and the client may be handled outside of the set-cookie header/cookie header content of the transaction layer and managed in the message body/content layer of request and responses between the client and the intermediary.

Any portion of the cookie management techniques discussed herein may be performed transparently and seamlessly to the browser and/or the server. Although the script instructions and/or script are executed by the browser, the browser may be unaware that the management of the cookie outside of the transaction layer of HTTP is being handled via these scripts and/or the intermediary. The server sends set-cookie headers to the client and receives cookie headers from the client and as such may be unaware of the cookie management operations at the content layer performed by the intermediary or any of the client-side scripting.

In view of the structure, functions and operations of the systems and methods described herein, the present solution provides a useful way for managing cookies outside of the transaction or header layer of HTTP. This provides advantages in the context of a rewriting reverse proxy, such as appliance 200, or a content rewriting agent, such as the client agent or network engine 240. The present solution installs the correct cookies in the client browser respecting any and all cookie parameters. By correctly maintaining cookie parameters, such as across an SSL VPN connection, the present solution avoids compromised and corrupted cookie data leading to security leaks and application instability.

What is claimed:

1. A method for managing browser cookies by an intermediary between a client and server via content of an Hypertext Transfer Protocol (HTTP) message, the method comprising:
   (a) receiving, by an intermediary between a client and server, a response of the server to a request of the client, the response comprising a message body and a header, the header comprising cookie information specifying a domain and a path;
   (b) removing, by the intermediary, the cookie information from the header of the response;
   (c) modifying, by the intermediary, the message body of the response to include script instructions for execution by a browser of the client to set a value of the domain and the path of the cookie based on cookie information stored in a storage element, to include an identification of a Uniform Resource Locator of a script for execution by the browser to detect a change to the cookie by the browser; and
   (d) forwarding, by the intermediary, the modified response to the client.

2. The method of claim 1, comprising identifying a Uniform Resource Locator of a location in storage of the intermediary.

3. The method of claim 1, comprising receiving, by the intermediary, a request to update the cookie information of the intermediary from the script detecting the change to the cookie, and in response to the message, making the change to the cookie information stored in the storage element.

4. The method of claim 1, comprising receiving, by the intermediary, a request from the browser including a second cookie having encoded values representing changes to the cookie, and in response to receiving the second cookie, updating the cookie information in the storage element based on the second cookie.

5. The method of claim 1, comprising modifying, by the intermediary, the message body of the response to include one or more scripts to detect an event of the browser to one of an add, delete or modify the cookie.

6. The method of claim 1, comprising modifying, by the intermediary, the message body of the response to include one or more scripts to remove the cookie upon detection of an unload event of the browser.

7. The method of claim 1, comprising rewriting, by the intermediary providing a virtual private network connection between the client and the server, a Uniform Resource Locator in the modified response to translate the Uniform Resource Locator between a first network of the client and a second network of the server.

8. The method of claim 1, comprising rewriting, by the intermediary providing a virtual private network connection between the client and the server, the domain and the path of the cookie information in the modified response to translate between a first network of the client and a second network of the server.

9. The method of claim 1, comprising receiving, by the intermediary, from the browser a second request, modifying the header of the request to include cookie information stored in the storage element, and forwarding the modified request to the server.

10. A method for managing browser cookies by an intermediary between a client and server via content of an Hypertext Transfer Protocol (HTTP) message, the method comprising:
    (a) receiving, by an intermediary between a client and server, a response of the server to a request of the client, the response comprising a message body and a header, the header comprising cookie information specifying a domain and a path;
    (b) removing, by the intermediary, the cookie information from the header of the response;
    (c) modifying, by the intermediary, the message body of the response to include script instructions for execution by a browser of the client to set a value of the domain and the path of the cookie based on cookie information stored in a storage element and to insert instructions of a script for execution by the browser to detect a change to the cookie by the browser; and
    (d) forwarding, by the intermediary, the modified response to the client.

11. The method of claim 10, comprising identifying a Uniform Resource Locator of a location in storage of the intermediary.

12. The method of claim 10 comprising receiving, by the intermediary, a request to update the cookie information of the intermediary from the script detecting the change to the cookie, and in response to the message, making the change to the cookie information stored in the storage element.

13. The method of claim 10, comprising receiving, by the intermediary, a request from the browser including a second cookie having encoded values representing changes to the cookie, and in response to receiving the second cookie, updating the cookie information in the storage element based on the second cookie.

14. The method of claim 10, comprising modifying, by the intermediary, the message body of the response to include one or more scripts to detect an event of the browser to one of an add, delete or modify the cookie.

15. The method of claim 10, comprising modifying, by the intermediary, the message body of the response to include one or more scripts to remove the cookie upon detection of an unload event of the browser.

16. The method of claim 10, comprising rewriting, by the intermediary providing a virtual private network connection between the client and the server, a Uniform Resource Locator in the modified response to translate the Uniform Resource Locator between a first network of the client and a second network of the server.

17. The method of claim 10, comprising rewriting, by the intermediary providing a virtual private network connection between the client and the server, the domain and the path of the cookie information in the modified response to translate between a first network of the client and a second network of the server.

18. The method of claim 10, comprising receiving, by the intermediary, from the browser a second request, modifying the header of the request to include cookie information stored in the storage element, and forwarding the modified request to the server.

19. A system for managing browser cookies by an intermediary between a client and server via content of an Hypertext Transfer Protocol (HTTP) message, the system comprising:
a device intermediary to a client and a server;
an engine executing on the device receiving a response of the server to a request of the client, the response comprising a message body and a header, the header comprising cookie information specifying a domain and a path; wherein the engine removes the cookie information from the header of the response; and modifies the message body of the response to include script instructions for execution by a browser of the client to set a value of the domain and the path of the cookie based on cookie information stored in a storage element, to include an identification of a Uniform Resource Locator of a script for execution by the browser to detect a change to the cookie by the browser; and
wherein the device forwards the modified response to the client.

20. The system of claim 19, wherein the device identifies a Uniform Resource Locator of a location in storage of the intermediary.

21. The system of claim 19, wherein the device receives a request to update the cookie information of the intermediary from the script detecting the change to the cookie, and in response to the message, makes the change to the cookie information stored in the storage element.

22. The system of claim 19, wherein the device receives a request from the browser including a second cookie having encoded values representing changes to the cookie, and in response to receiving the second cookie, updates the cookie information in the storage element based on the second cookie.

23. The system of claim 19, wherein the device modifies the message body of the response to include one or more scripts to detect an event of the browser to one of an add, delete or modify the cookie.

24. The system of claim 19, wherein the device modifies the message body of the response to include one or more scripts to remove the cookie upon detection of an unload event of the browser.

25. The system of claim 19, wherein the device providing a virtual private network connection between the client and the server rewrites a Uniform Resource Locator in the modified response to translate the Uniform Resource Locator between a first network of the client and a second network of the server.

26. The system of claim 19, wherein the device providing a virtual private network connection between the client and the server rewrites the domain and the path of the cookie information in the modified response to translate between a first network of the client and a second network of the server.

27. The system of claim 19, wherein the device receives from the browser a second request, modifying the header of the request to include cookie information stored in the storage element, and forwarding the modified request to the server.

28. A system for managing browser cookies by an intermediary between a client and server via content of an Hypertext Transfer Protocol (HTTP) message, the system comprising:
a device intermediary to a client and a server;
an engine executing on the device receiving a response of the server to a request of the client, the response comprising a message body and a header, the header comprising cookie information specifying a domain and a path; wherein the engine removes the cookie information from the header of the response; and modifies the message body of the response to include script instructions for execution by a browser of the client to set a value of the domain and the path of the cookie based on cookie information stored in a storage element and to insert instructions of a script for execution by the browser to detect a change to the cookie by the browser; and
wherein the device forwards the modified response to the client.

29. The system of claim 28, wherein the device identifies a Uniform Resource Locator of a location in storage of the intermediary.

30. The system of claim 28, wherein the device receives a request to update the cookie information of the intermediary from the script detecting the change to the cookie, and in response to the message, makes the change to the cookie information stored in the storage element.

31. The system of claim 28, wherein the device receives a request from the browser including a second cookie having encoded values representing changes to the cookie, and in response to receiving the second cookie, updates the cookie information in the storage element based on the second cookie.

32. The system of claim 28, wherein the device modifies the message body of the response to include one or more scripts to detect an event of the browser to one of an add, delete or modify the cookie.

33. The system of claim 28, wherein the device modifies the message body of the response to include one or more scripts to remove the cookie upon detection of an unload event of the browser.

34. The system of claim 28, wherein the device providing a virtual private network connection between the client and the server rewrites a Uniform Resource Locator in the modified response to translate the Uniform Resource Locator between a first network of the client and a second network of the server.

35. The system of claim 28, wherein the device providing a virtual private network connection between the client and the server rewrites the domain and the path of the cookie information in the modified response to translate between a first network of the client and a second network of the server.

36. The system of claim 28, wherein the device receives from the browser a second request, modifying the header of the request to include cookie information stored in the storage element, and forwarding the modified request to the server.

* * * * *